(12) United States Patent
Luo

(10) Patent No.: US 11,838,046 B2
(45) Date of Patent: *Dec. 5, 2023

(54) WIRELESS DEVICES AND SYSTEMS INCLUDING EXAMPLES OF FULL DUPLEX TRANSMISSION USING NEURAL NETWORKS OR RECURRENT NEURAL NETWORKS

(71) Applicant: MICRON TECHNOLOGY, INC., Boise, ID (US)

(72) Inventor: Fa-Long Luo, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/224,962

(22) Filed: Apr. 7, 2021

(65) Prior Publication Data
US 2021/0258038 A1    Aug. 19, 2021

Related U.S. Application Data

(63) Continuation of application No. 16/561,868, filed on Sep. 5, 2019, now Pat. No. 10,979,097.

(51) Int. Cl.
*H04B 1/525* (2015.01)
*H04L 5/14* (2006.01)
(Continued)

(52) U.S. Cl.
CPC ............. *H04B 1/525* (2013.01); *H04L 5/143* (2013.01); *H04L 5/1461* (2013.01); *H04L 25/03343* (2013.01); *H04L 27/2633* (2013.01)

(58) Field of Classification Search
USPC ......................................................... 375/296
See application file for complete search history.

(56) References Cited

U.S. PATENT DOCUMENTS 5,377,108 A     12/1994  Nishio
6,199,057 B1 *   3/2001  Tawel .................... G01M 15/11
                                                                706/41
(Continued)

FOREIGN PATENT DOCUMENTS

CN        101547021 A      9/2009
CN        101563851 A      10/2009
(Continued)

OTHER PUBLICATIONS

US 11,088,716 B2, 08/2021, Luo et al. (withdrawn)
(Continued)

*Primary Examiner* — Leila Malek

(57) ABSTRACT

Examples described herein include systems and methods which include wireless devices and systems with examples of full duplex compensation with a self-interference noise calculator. The self-interference noise calculator may be coupled to antennas of a wireless device and configured to generate adjusted signals that compensate self-interference. The self-interference noise calculator may include a network of processing elements configured to combine transmission signals into intermediate results according to input data and delayed versions of the intermediate results. Each set of intermediate results may be combined in the self-interference noise calculator to generate a corresponding adjusted signal. The adjusted signal is received by a corresponding wireless receiver to compensate for the self-interference noise generated by a wireless transmitter transmitting on the same frequency band as the wireless receiver is receiving.

18 Claims, 14 Drawing Sheets

(51) Int. Cl.
*H04L 25/03* (2006.01)
*H04L 27/26* (2006.01)

(56) References Cited

U.S. PATENT DOCUMENTS

| | | |
|---|---|---|
| 6,515,978 B1 | 2/2003 | Buehrer et al. |
| 6,765,495 B1 | 7/2004 | Dunning et al. |
| 7,965,990 B2 | 6/2011 | Luz et al. |
| 9,147,353 B1 | 9/2015 | Slusar |
| 9,172,441 B2 | 10/2015 | Granger-Jones et al. |
| 9,391,680 B2 | 7/2016 | Le-Ngoc et al. |
| 9,467,220 B2 | 10/2016 | Walsh et al. |
| 10,050,663 B1 | 8/2018 | Ku et al. |
| 10,070,432 B1 | 9/2018 | Luo et al. |
| 10,142,137 B2 | 11/2018 | Luo et al. |
| 10,185,998 B1 | 1/2019 | Konrardy et al. |
| 10,554,375 B2 | 2/2020 | Luo et al. |
| 10,778,403 B2 | 9/2020 | Luo et al. |
| 10,805,128 B2 | 10/2020 | Lua et al. |
| 10,880,132 B1 | 12/2020 | Mirfakhraei et al. |
| 10,924,139 B2 | 2/2021 | Cong et al. |
| 10,972,139 B1 | 4/2021 | Luo |
| 10,979,097 B2 | 4/2021 | Luo |
| 11,206,050 B2 | 12/2021 | Luo et al. |
| 11,258,473 B2 | 2/2022 | Luo |
| 11,387,976 B2 | 7/2022 | Luo et al. |
| 2002/0155821 A1 | 10/2002 | Louis et al. |
| 2002/0172265 A1 | 11/2002 | Kenney |
| 2005/0060069 A1 | 3/2005 | Breed et al. |
| 2005/0078615 A1 | 4/2005 | Muri |
| 2006/0162985 A1 | 7/2006 | Tanaka et al. |
| 2007/0160014 A1 | 7/2007 | Larsson |
| 2008/0117411 A1 | 5/2008 | Vuong et al. |
| 2009/0180404 A1 | 7/2009 | Jung et al. |
| 2009/0233555 A1 | 9/2009 | Nakamura |
| 2009/0316842 A1 | 12/2009 | Lu et al. |
| 2010/0027638 A1 | 2/2010 | Suh et al. |
| 2010/0191391 A1 | 7/2010 | Zeng |
| 2011/0106442 A1 | 5/2011 | Desai et al. |
| 2011/0171922 A1 | 7/2011 | Kim et al. |
| 2011/0216662 A1 | 9/2011 | Nie et al. |
| 2012/0106405 A1 | 5/2012 | Lioliou et al. |
| 2012/0170619 A1 | 7/2012 | Chang et al. |
| 2012/0306680 A1 | 11/2012 | Pietsch et al. |
| 2013/0044791 A1 | 2/2013 | Rimini et al. |
| 2013/0084868 A1 | 4/2013 | Song et al. |
| 2013/0158852 A1 | 6/2013 | Stahiin et al. |
| 2014/0003264 A1 | 1/2014 | Shin |
| 2014/0056229 A1 | 2/2014 | Li et al. |
| 2014/0153494 A1 | 6/2014 | Liu |
| 2014/0169236 A1 | 6/2014 | Choi et al. |
| 2014/0219139 A1 | 8/2014 | Choi et al. |
| 2015/0018043 A1 | 1/2015 | Taniuchi et al. |
| 2015/0043323 A1 | 2/2015 | Choi et al. |
| 2015/0055568 A1 | 2/2015 | Jindal et al. |
| 2015/0085944 A1 | 3/2015 | Mobasher et al. |
| 2015/0139347 A1 | 5/2015 | Murch et al. |
| 2015/0140926 A1 | 5/2015 | Fujio et al. |
| 2015/0146765 A1 | 5/2015 | Moffatt et al. |
| 2015/0244436 A1 | 8/2015 | Le-ngoc et al. |
| 2015/0271831 A1 | 9/2015 | Wang et al. |
| 2015/0311931 A1 | 10/2015 | Rozental et al. |
| 2016/0036504 A1 | 2/2016 | Khojastepour et al. |
| 2016/0036582 A1 | 2/2016 | Jana et al. |
| 2016/0100415 A1 | 4/2016 | Mishra et al. |
| 2016/0127099 A1 | 5/2016 | Le et al. |
| 2016/0226535 A1 | 8/2016 | Choi et al. |
| 2016/0226653 A1 | 8/2016 | Bharadia et al. |
| 2016/0233903 A1 | 8/2016 | Wu et al. |
| 2016/0261413 A1 | 9/2016 | Osseiran et al. |
| 2017/0061625 A1 | 3/2017 | Estrada et al. |
| 2017/0091953 A1 | 3/2017 | Bleiweiss et al. |
| 2017/0104576 A1 | 4/2017 | Liu et al. |
| 2017/0131719 A1 | 5/2017 | Micks et al. |
| 2017/0150481 A1 | 5/2017 | Gupta et al. |
| 2017/0188264 A1 | 6/2017 | Hwang et al. |
| 2017/0237547 A1 | 8/2017 | Eltawil et al. |
| 2017/0257180 A1 | 9/2017 | Aggarwal et al. |
| 2017/0273090 A1 | 9/2017 | Jung et al. |
| 2017/0303285 A1 | 10/2017 | Kenney et al. |
| 2018/0006690 A1 | 1/2018 | Shepard et al. |
| 2018/0006794 A1 | 1/2018 | Lee et al. |
| 2018/0026775 A1 | 1/2018 | Chen et al. |
| 2018/0048339 A1 | 2/2018 | Wu et al. |
| 2018/0062767 A1 | 3/2018 | Vallese et al. |
| 2018/0076947 A1 | 3/2018 | Kazakevich et al. |
| 2018/0091284 A1 | 3/2018 | Min et al. |
| 2018/0123583 A1 | 5/2018 | Wakabayashi et al. |
| 2018/0152330 A1 | 5/2018 | Chritz et al. |
| 2018/0159615 A1 | 6/2018 | Kim |
| 2018/0206176 A1 | 7/2018 | Panteleev et al. |
| 2018/0254930 A1 | 9/2018 | Luo et al. |
| 2018/0278290 A1 | 9/2018 | Moorti et al. |
| 2018/0302048 A1 | 10/2018 | Donoghue et al. |
| 2018/0309526 A1 | 10/2018 | Zhang et al. |
| 2018/0315157 A1 | 11/2018 | Ould-Ahmed-Vall et al. |
| 2018/0367192 A1* | 12/2018 | O'Shea .......... G06N 3/0445 |
| 2019/0007242 A1 | 1/2019 | Luo et al. |
| 2019/0020381 A1 | 1/2019 | Tooher et al. |
| 2019/0027824 A1 | 1/2019 | Pajona et al. |
| 2019/0028260 A1 | 1/2019 | Karlsson et al. |
| 2019/0065945 A1 | 2/2019 | Luo et al. |
| 2019/0065951 A1 | 2/2019 | Luo et al. |
| 2019/0081766 A1 | 3/2019 | Luo et al. |
| 2019/0081767 A1 | 3/2019 | Luo et al. |
| 2019/0123442 A1 | 4/2019 | Vannucci et al. |
| 2019/0229884 A1 | 7/2019 | Xue et al. |
| 2019/0238213 A1 | 8/2019 | Sfar et al. |
| 2019/0245565 A1 | 8/2019 | Luo et al. |
| 2019/0245566 A1 | 8/2019 | Luo et al. |
| 2019/0325928 A1* | 10/2019 | Jain .......... G11C 7/14 |
| 2019/0393948 A1 | 12/2019 | Zhao et al. |
| 2020/0127803 A1 | 4/2020 | Luo et al. |
| 2020/0196326 A1 | 6/2020 | Li et al. |
| 2020/0205156 A1 | 6/2020 | Adjakple et al. |
| 2020/0205230 A1 | 6/2020 | Haustein et al. |
| 2020/0358177 A1 | 11/2020 | Ge et al. |
| 2020/0366538 A1 | 11/2020 | Luo et al. |
| 2020/0405204 A1 | 12/2020 | Howard |
| 2020/0412518 A1 | 12/2020 | Luo et al. |
| 2021/0075464 A1 | 3/2021 | Luo |
| 2021/0275050 A1 | 9/2021 | Ren et al. |
| 2021/0409132 A1 | 12/2021 | Bouttier et al. |
| 2022/0108157 A1 | 4/2022 | Hunter et al. |
| 2022/0116130 A1 | 4/2022 | Elmaghbub et al. |
| 2022/0140850 A1 | 5/2022 | Luo |
| 2022/0217724 A1 | 7/2022 | Pezeshki et al. |
| 2022/0353051 A1 | 11/2022 | Luo et al. |

FOREIGN PATENT DOCUMENTS

| | | |
|---|---|---|
| CN | 103780300 A | 5/2014 |
| CN | 104052529 A | 9/2014 |
| CN | 104067585 A | 9/2014 |
| CN | 104468055 A | 3/2015 |
| CN | 104539341 A | 4/2015 |
| CN | 105075157 A | 11/2015 |
| CN | 105594131 A | 5/2016 |
| CN | 105934889 A | 9/2016 |
| CN | 106034097 A | 10/2016 |
| CN | 106134095 A | 11/2016 |
| CN | 106301419 A | 1/2017 |
| CN | 106559365 A | 4/2017 |
| CN | 107124245 A | 9/2017 |
| CN | 110383720 A | 10/2019 |
| DE | 102015015021 A1 | 5/2016 |
| EP | 1164758 A2 | 12/2001 |
| EP | 3075095 A1 | 10/2016 |
| EP | 3200371 A1 | 8/2017 |
| JP | 2016529837 A | 9/2016 |
| JP | 2016225908 A | 12/2016 |
| KR | 20070116736 A | 12/2007 |
| KR | 20100095650 A | 8/2010 |
| KR | 20130132817 A | 12/2013 |

(56) References Cited

FOREIGN PATENT DOCUMENTS

| | | | |
|---|---|---|---|
| KR | 20160090372 A | 7/2016 | |
| KR | 20160127099 A | 11/2016 | |
| KR | 20160146655 A | 12/2016 | |
| KR | 20190091818 A | 8/2019 | |
| WO | 2004095625 A2 | 11/2004 | |
| WO | 2010147280 A1 | 12/2010 | |
| WO | 2016111638 A1 | 7/2016 | |
| WO | 2016154219 A1 | 9/2016 | |
| WO | 2017026970 A1 | 2/2017 | |
| WO | 2017069300 A1 | 4/2017 | |
| WO | 2017121487 A1 | 7/2017 | |
| WO | 2018160664 A1 | 9/2018 | |
| WO | 2019046103 A1 | 3/2019 | |
| WO | 2019050980 A1 | 3/2019 | |
| WO | 2019156820 A1 | 8/2019 | |
| WO | WO-2019148106 A1 * | 8/2019 | ........... A61B 5/0002 |
| WO | 2021211560 A1 | 10/2021 | |

OTHER PUBLICATIONS

US 11,424,969 B2, 08/2022, Luo et al. (withdrawn)
Wang, Li , "Exploiting Full Duplex for Device-to-Device Communications in Heterogeneous Networks", IEEE Communications Magazine, May 2015.
Chang, Bao R. et al., "Intelligent Data Fusion System for Predicting Vehicle Collision Warning Using Vision/GPS Sensing"; Expert Systems with Applications 37 (2010) 2439-2450; Mar. 2010; pp. 1-12.
Kehtarnavaz, Nasser , "A Transportable Neural-Network Approach to Autonomous Vehicle Following", IEEE Transactions on Vehicular Technology, vol. 47, No. 2, May 1998.
U.S. Appl. No. 16/718,930 titled "Full Duplex Device-to-Device Cooperation Communication", filed Dec. 18, 2019, pp. all.
U.S. Appl. No. 17/018,256 titled "Full Duplex Device-to-Device Cooperative Communication" filed Sep. 11, 2020, pp. all.
U.S. Appl. No. 16/561,868 titled "Wireless Devices and Systems Including Examples of Full Duplex Transmission Using Neural Networks or Recurrent Neural Networks" filed Sep. 5, 2019, pp. all.
International Search Report/Written Opinion dated Nov. 17, 2020 for PCT Application No. PCT/US2020/045029, 9 pgs.
PCT Appl. No. PCT/US18/49598 titled "Full Duplex Device-To-Device Cooperative Communication" filed Sep. 5, 2018, pp. all.
PCT Application No. PCT/US18/20177, entitled "Wireless Devices and Systems Including Examples of Full Duplex Transmission", filed Feb. 28, 2018, pp. all.
PCT Application No. PCT/US18/47783 titled "Cooperative Learning Neural Networks and Systems" filed on Aug. 23, 2018, pp. all.
PCT Application No. PCT/US2020/045029 titled "Wireless Devices and Systems Including Examples of Full Duplex Transmission Using Neural Networks or Recurrent Neural Networks" filed Aug. 5, 2020, pp. ail.
U.S. Appl. No. 16/848,514 titled "Self Interference Noise Cancellation to Support Multiple Frequency Bands With Neural Networks or Recurrent Neural Networks" filed Apr. 14, 2020, pp. all.
U.S. Appl. No. 16/983,797 titled "Wireless Devices and Systems Including Examples of Full Duplex Transmission" filed Aug. 3, 2020, pp. all.
U.S. Appl. No. 15/890,275 entitled "Self Interference Noise Cancellation to Support Multiple Frequency Bands" filed Feb. 6, 2018, pp. all.
U.S. Appl. No. 16/114,523 titled "Cooperative Learning Neural Networks and Systems" filed Aug. 28, 2018, pp. all.
U.S. Appl. No. 16/116,365 titled "Full Duplex Device-to-Device Cooperative Communication" filed Aug. 29, 2018, pp. all.
U.S. Appl. No. 15/693,142, entitled "Cooperative Learning Neural Networks and Systems", filed Aug. 31, 2017, pp. ail.
U.S. Appl. No. 15/701,007 entitled "Full Duplex Device-to-Device Cooperative Communication" filed Sep. 11, 2017, pg. all.
U.S. Appl. No. 15/105,915 titled "Wireless Devices and Systems Including Examples of Full Duplex Transmission", filed Aug. 20, 2018, pp. all.
U.S. Appl. No. 16/113,595 titled "Self Interference Noise Cancellation to Support Multiple Frequency Bands"; filed Aug. 27, 2018, pp. all.
U.S. Appl. No. 15/447,731 entitled "Wireless Devices and Systems Including Examples of Full Duplex Transmission", filed Mar. 2, 2017, pp. all.
Anttila, Lauri et al., "Modeling and Efficient Cancellation of Nonlinear Self-Interference in Mimo Full-Duplex Transceivers", IEEE Globecom Workshops, Dec. 2014, 7 pgs.
Chang, Bao Rong et al., "Simulation for Implementation of High-Performance Collision Warning System for Motor Behicle Safety Using Embedded ANFIS Prediction"; 3rd International Conference on Innovative Computing Information and Control (ICICIC '08); IEEE; 2008; pp. all.
Chen, C. et al., "A rear-end collision prediction scheme based on deep learning in the Internet of Vehicles"; J. Parallel Distribut. Comput.; Elsevier, 2017, pp. all.
Geevarghese, Suu et al., "CDMA Interferance Cancellation Techniques Using Neural Networks in Rayleigh Channels", IEEE: International Conference on Information Communication and Embedded Systems (ICACES), Feb. 2013, 5 pgs.
Kang, M et al. "Intrusion Detection System Using Deep Nearal Network for in-Vehicle Network Security"; Research Article; The Department of Electronics Engineering, EWHS W. University, Seoul, Republic of Korea, Jun. 7, 2016, pp. all.
Kim, Seunghyeon et al., "Transfer Learning for Automated Optical Inspection"; 2017 international Conference on Neural Networks (ICNN), Jul. 3, 2017; pp. ail.
Young, Chung-Ping et al., "Highway Vehicle Accident Reconstruction Using Cooperative Collision Warning Based Motor Vehicle Event Data Recorder": IEEE. 2009, pp. all.
Kristensen, Toftegaard A. et al., "Advanced Machine Learning Techniques for Self-Interference Cancellation in Full-Duplex Radios", 53rd Asiiomar Conference on Signals, Systems, and Computers, Date of Conference Nov. 3-6, 2019, pp. 1-5.
Sulaiman, Ahmed et al.. "Elman Recurrent Neural Network Application in Adaptive Beamforming of Smart Antenna System", International Journal of Computer Applications K0975-8887), vol. 129, No. 11, Nov. 2015, pp. 38-43.
Tarver, Chance et al., "Neural Network DPD via Backpropagation Through Neural Network Model of the PA", 53rd Asiiomar Conference on Signals, Systems, and Computers, Date of Conference: Nov. 3-6, 2019, pp. 1-5 and figure 4.
U.S. Appl. No. 17/811,472 titled "Full Duplex Device-to-Device Cooperative Communication" filed Jul. 8, 2022, pp. all pages of application as filed.
E. Lee and H. Yeo; "A Study on the Rear-End Collision Warning System by Considering Different Perception-Reaction Time Using Multi-Layer Perception Neural Network"; 2015 IEEE Intelligent Vehicles Symposium (IV); Jun. 28-Jul. 1, 2015; COEX, Seoul, Korea, pp. all.
PCT Application No. PCT/U32021/027053 titled "Self Interference Noise Cancellation to Support Multiple Frequency Bands With Neural Networks or Recurrent Neural Networks" filed Apr. 13. 2021.
Anttila, Lauri et al., "Modeling and Efficient Cancellation of Nonlinear Self-Interference in MIMO Full-Duplex Transceivers", IEEE, Oct. 2014, 7 pgs.
Zhang, Zhongshan et al. "Full Duplex Techniquest for 5G Networks: Self-Interference Cancellation, Protocol Design, and Relay Selection", IEEE Communications Magazine, May 2015, 10 pgs.
Linsen Chong et al. "A Rule-Based Neural Network Approach to Model Driver Naturalistic Behavior in Traffic" Transportation Research Part C; www.elsevier.com/locate/trc; vol. 32, Jul. 2013, pp. 207-223.
U.S. Appl. No. 17/821,419, titled, "Wireless Devices and Systems Including Examples of Full Duplex Transmission," filed Aug. 22, 2022, pp. all pages of application as filed.
Campolo, Claudia et al., "Full-Deplex Radios for Vehicular Communications", IEEE Communications Magazine, Jun. 2017; pp. all.

(56) References Cited

OTHER PUBLICATIONS

Tran et al., "On the Performance of Distributed Space-Time Coded Cooperative Relay Networks Based on Inter-Relay Communications", EURASIP Journal on Wireless Communications and Networking, Oct. 2013; pp. all.

Wang, Li et al., "Exploiting Full Duplex for Device-to-Device Communications in Heterogeneous Networks", IEEE Communications Magazine, May 2015; pp. all.

U.S. Appl. No. 18/065,062, filed Dec. 13, 2022, titled, "Self Interference Noise Cancellation to Support Multiple Frequency Bands,"; pp. all pages of application as filed.

U.S. Appl. No. 18/161,600, filed Jan. 30, 2023, titled, "Self Interference Noise Cancellation to Support Multiple Frequency Bands With Neural Networks or Recurrent Neural Networks,"; pp. all pages of application as filed.

Jinshuan Peng et al. "Multi-Parameter Prediction of Drivers' Lane-Changing Behaviour With Neural Network Model"; Applied Ergonomics, vol. 50, Sep. 2015, pp. 207-217.

\* cited by examiner

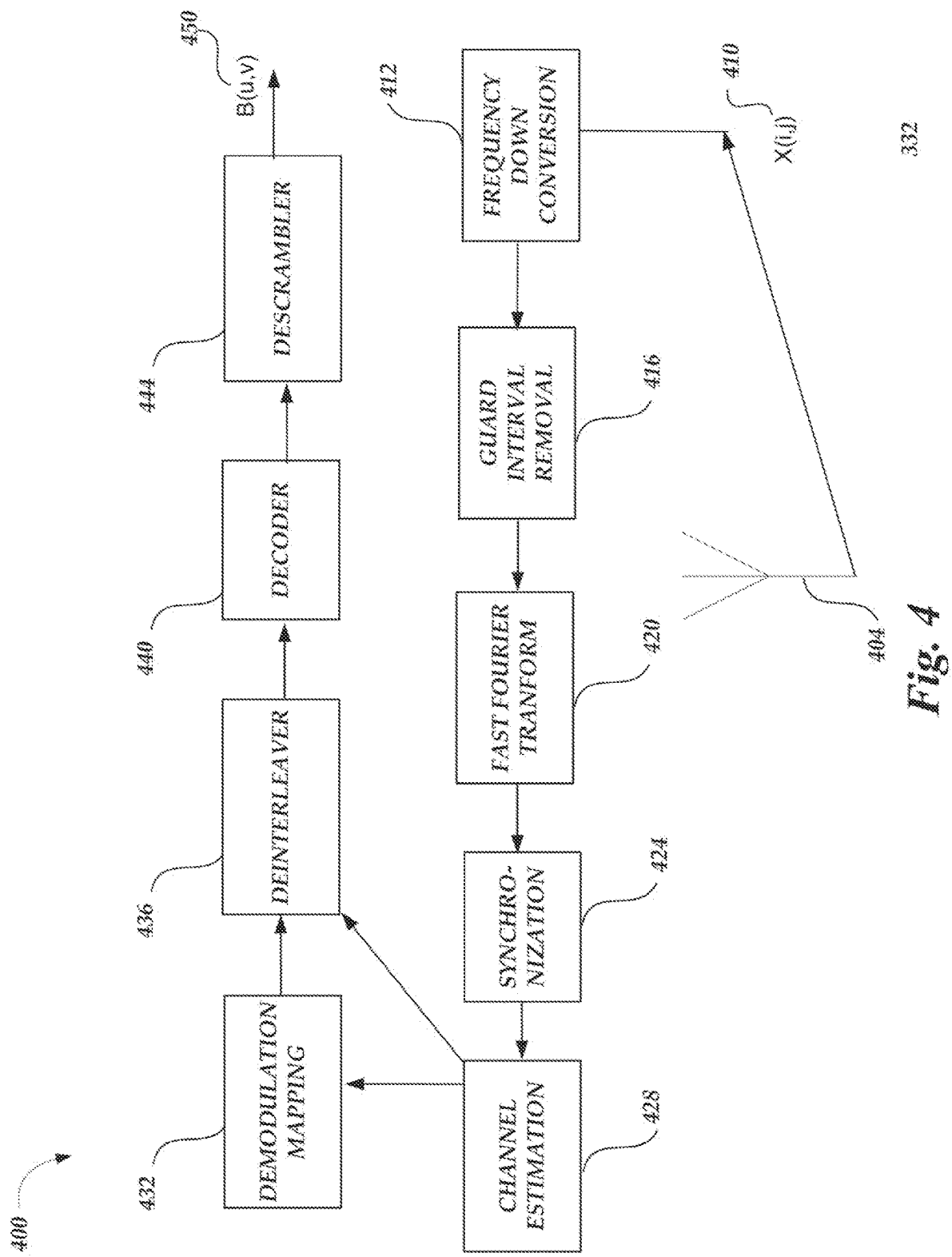

US 11,838,046 B2

WIRELESS DEVICES AND SYSTEMS INCLUDING EXAMPLES OF FULL DUPLEX TRANSMISSION USING NEURAL NETWORKS OR RECURRENT NEURAL NETWORKS

CROSS REFERENCE TO RELATED APPLICATION(S)

This application is a continuation of U.S. patent application Ser. No. 16/561,868 filed Sep. 5, 2019 and issued as U.S. Pat. No. 10,979,097 on Apr. 13, 2022. The aforementioned application, and issued patent, is incorporated herein by reference, in its entirety, for any purpose.

BACKGROUND

There is interest in moving wireless communications to "fifth generation" (5G) systems. 5G promises increased speed and ubiquity, but methodologies for processing 5G wireless communications have not yet fully been set. Example 5G systems may be implemented using multiple-input multiple-output (MIMO) techniques, including "massive MIMO" techniques, in which multiple antennas (more than a certain number, such as 8 in the case of example MIMO systems) are utilized for transmission and/or receipt of wireless communication signals.

BRIEF DESCRIPTION OF THE DRAWINGS

FIG. 4 is a schematic illustration of wireless receiver.

DETAILED DESCRIPTION

Figure 1:
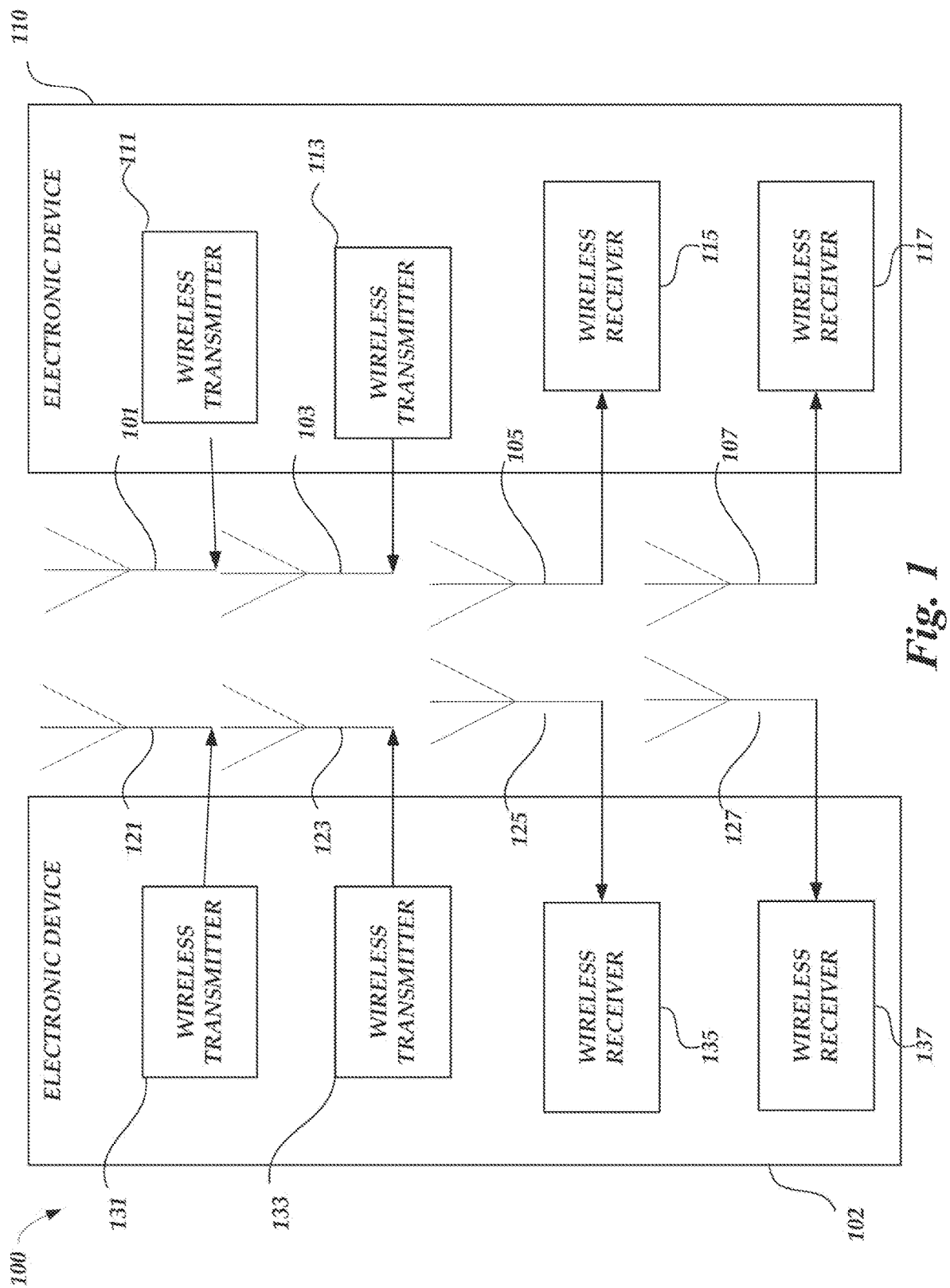
FIG. 1 is a schematic illustration of a system arranged in accordance with examples described herein.

Full duplex communication may be desirable for a variety of devices. Full duplex communication generally may refer to an ability to both send and receive transmissions, in some cases simultaneously and/or partially simultaneously. In examples of systems employing full duplex communication, it may be desirable to cancel interference generated by other antennas in the system. Examples described herein may compensate for interference generated by other antennas co-located on the same physical device or system (e.g., interference created by an antenna on a MIMO device). In the example of frequency duplexing (FD), an antenna transmitting a transmission on a certain frequency band may create interference for an antenna, co-located on the same device, receiving a transmission on the same frequency band. Such interference may be referred to as self-interference. Self-interference may disrupt the accuracy of signals transmitted or received by the MIMO device. Examples described herein may compensate for self-interference at an electronic device, which may aid in achieving full complex transmission. A network of processing elements may be used to generate adjusted signals to compensate for self-interference generated by the antennas of the electronic device.

5G systems may advantageously make improved usage of full duplex transmission mode, for example, to improve spectrum efficiency. Frequency bands in some systems may be assigned by regulatory authorities such as the Federal Communication Commission (FCC). Assignments may be made, for example, according to different applications such as digital broadcasting and wireless communication. These licensed and assigned frequencies may be wasted if there is simply time-division duplex (TDD), frequency-division duplex (FDD) or half-duplex FDD mode, which are duplexing modes often used in existing wireless applications. Such modes may not be acceptable when improved efficiency is demanded from the wireless spectrum. Moreover, with the fast development of digital transmission and communications, there are fewer and fewer unlicensed frequency bands and it may be advantageous to use those licensed frequency bands in a full duplex transmission mode. For example, the FCC has officially proposed to open some UHF bands for unlicensed uses and is also considering how to use the frequency bands which are over 6 GHz (e.g. millimeter wave bands). Examples described herein may be utilized to achieve full duplex transmission in some examples on existing frequency bands including the aforementioned unlicensed frequency bands and 6 GHz bands. Full-duplex (FD) transmission may allow a wireless communication system to transmit and receive the signals, simultaneously, in the same frequency band. This may allow FD-based 5G systems to the spectrum efficiency of any frequency band.

Examples described herein include systems and methods which include wireless devices and systems with a self-interference noise calculator. The self-interference noise calculator may utilize a network of processing elements to generate a corresponding adjusted signal for self-interference that an antenna of the wireless device or system is expected to experience due to signals to be transmitted by another antenna of the wireless device or system. Such a network of processing elements may combine transmission signals to provide intermediate processing results that are further combined, based on respective weights, to generate adjusted signals. The network of processing elements may be referred to as a neural network. In some implementations with delayed versions of intermediate processing results being utilized, such a network of processing elements may be referred to as a recurrent neural network. A respective weight vector applied to the intermediate processing result may be based on an amount of interference expected for the respective transmission signal from the corresponding intermediate processing result. In some examples, a self-interference noise calculator may include bit manipulation units, multiplication/accumulation (MAC) processing units, and/or memory look-up (MLU) units. For example, layers of MAC processing units may weight the intermediate processing results using a plurality of coefficients (e.g., weights) based on a minimized error for the all or some of the adjustment signals that may generated by a self-interference noise calculator. In minimizing the error for the adjustment signals, a wireless device or system may achieve full duplex transmission utilizing the self-interference noise calculator.

Examples described herein additionally include systems and methods which include wireless devices and systems with examples of mixing input data with such coefficient data in multiple layers of multiplication/accumulation units (MAC units) and corresponding memory look-up units (MLUs). For example, a number of layers of MAC units may correspond to a number of wireless channels, such as a number of channels received at respective antennas of a plurality of antennas. In addition, a number of MAC units and MLUs utilized is associated with the number of channels. For example, a second layer of MAC units and MLUs may include m−1 MAC units and MLUs, where m represents the number of antennas, each antenna receiving a portion of input data. Advantageously, in utilizing such a hardware framework, the processing capability of generated output data may be maintained while reducing a number of MAC units and MLUs, which are utilized for such processing in an electronic device. In some examples, however, where board space may not be limited, a hardware framework may be utilized that includes m MAC units and m MLUs in each layer, where m represents the number of antennas.

Multi-layer neural networks (NNs) and/or multi-layer recurrent neural networks (RNNs) may be used to transmit wireless input data (e.g., as wireless input data to be transmitted via an antenna). The NNs and/or RNNs may have nonlinear mapping and distributed processing capabilities which may be advantageous in many wireless systems, such as those involved in processing wireless input data having time-varying wireless channels (e.g., autonomous vehicular networks, drone networks, or Internet-of-Things (IoT) networks). In this manner, neural networks and/or recurrent neural networks described herein may be used to implement full duplex communication for various wireless protocols (e.g., 5G wireless protocols), thereby cancelling self-interference generated by other antennas in the system.

In cancelling self-interference using RNNs, wireless systems and devices described herein may increase capacity of their respective wireless networks, with such systems being more invariant noise to than traditional wireless systems that do not use RNNs (e.g., utilizing time-delayed versions of processing results). For example, the recurrent neural networks may be used to reduce self-interference noise that will be present in transmitted signals (e.g., transmitter output data) based partly on the signals to be transmitted. Using time-delayed versions of processing results in an RNN of transmitter output data, the self-interference noise introduced in the time and frequency domains may be compensated, as the RNN utilizes respective time and frequency correlations with respect to the time-delayed versions of the input data (e.g., transmitter output data). In this manner, recurrent neural networks may be used to reduce and/or improve errors which may be introduced by self-interference noise. Advantageously, with such an implementation, wireless systems and devices implementing such RNNs increase capacity of their respective wireless networks because additional data may be transmitted in such networks, which would not otherwise be transmitted due to the effects of self-interference noise, e.g., which limits the amount of data to be transmitted due to compensation schemes in traditional wireless systems.

FIG. 1 is a schematic illustration of a system arranged in accordance with examples described herein. System 100 includes electronic device 102, electronic device 110, antenna 101, antenna 103, antenna 105, antenna 107, antenna 121, antenna 123, antenna 125, antenna 127, wireless transmitter 131, wireless transmitter 133, wireless receiver 135 and, wireless receiver 137. The electronic device 102 may include antenna 121, antenna 123, antenna 125, antenna 127, wireless transmitter 111, wireless transmitter 113, wireless receiver 115, and wireless receiver 117. The electronic device 110 may include antenna 101, antenna 103, antenna 105, and antenna 107. In operation, electronic devices 102, 110 can operate in a full duplex transmission mode between the respective antennas of each electronic device. In an example of a full duplex transmission mode, wireless transmitter 131 coupled to antenna 121 may transmit to antenna 105 coupled to wireless receiver 115, while, at the same time or during at least a portion of the same time, wireless transmitter 111 coupled to antenna 101 may transmit to antenna 127 coupled to wireless receiver 137, in some examples at a same frequency or in a same frequency band. Self-interference received by antenna 127 or antenna 105 from the respective transmissions at antenna 121 and antenna 101 may be compensated by the systems and methods described herein. Self-interference may generally refer to any wireless interference generated by transmissions from antennas of an electronic device to signals received by other antennas, or same antennas, on that same electronic device.

Electronic devices described herein, such as electronic device 102 and electronic device 110 shown in FIG. 1 may be implemented using generally any electronic device for which communication capability is desired. For example, electronic device 102 and/or electronic device 110 may be implemented using a mobile phone, smartwatch, computer (e.g. server, laptop, tablet, desktop), or radio. In some examples, the electronic device 102 and/or electronic device 110 may be incorporated into and/or in communication with other apparatuses for which communication capability is desired, such as but not limited to, a wearable device, a medical device, an automobile, airplane, helicopter, appliance, tag, camera, or other device.

While not explicitly shown in FIG. 1, electronic device 102 and/or electronic device 110 may include any of a variety of components in some examples, including, but not limited to, memory, input/output devices, circuitry, processing units (e.g. processing elements and/or processors), or combinations thereof. For example, electronic device 102 or electronic device 110 may each implement one or more processing units described herein, such as a processing unit 512 with reference to FIGS. 5C-5E, or any combinations thereof.

The electronic device 102 and the electronic device 110 may each include multiple antennas. For example, the electronic device 102 and electronic device 110 may each have more than two antennas. Three antennas each are shown in FIG. 1, but generally any number of antennas may be used including 2, 3, 4, 5, 6, 7, 8, 9, 10, 11, 12, 13, 14, 15, 16, 32, or 64 antennas. Other numbers of antennas may be used in other examples. In some examples, the electronic device 102 and electronic device 104 may have a same number of antennas, as shown in FIG. 1. In other examples, the electronic device 102 and electronic device 110 may have different numbers of antennas. Generally, systems described herein may include multiple-input, multiple-output ("MIMO") systems. MIMO systems generally refer to systems including one or more electronic devices which transmit transmissions using multiple antennas and one or more electronic devices which receive transmissions using multiple antennas. In some examples, electronic devices may both transmit and receive transmissions using multiple antennas. Some example systems described herein may be "massive MIMO" systems. Generally, massive MIMO systems refer to systems employing greater than a certain number (e.g. 8) antennas to transmit and/or receive transmissions. As the number of antennas increase, so to generally does the complexity involved in accurately transmitting and/or receiving transmissions.

Although two electronic devices (e.g. electronic device 102 and electronic device 110) are shown in FIG. 1, generally the system 100 may include any number of electronic devices.

Electronic devices described herein may include receivers, transmitters, and/or transceivers. For example, the electronic device 102 of FIG. 1 includes wireless transmitter 131 and wireless receiver 135, and the electronic device 110 includes wireless transmitter 111 and wireless receiver 115. Generally, receivers may be provided for receiving transmissions from one or more connected antennas, transmitters may be provided for transmitting transmissions from one or more connected antennas, and transceivers may be provided for receiving and transmitting transmissions from one or more connected antennas. While both electronic devices 102, 110 are depicted in FIG. 1 with individual wireless transmitter and individual wireless receivers, it can be appreciated that a wireless transceiver may be coupled to antennas of the electronic device and operate as either a wireless transmitter or wireless receiver, to receive and transmit transmissions. For example, a transceiver of electronic device 102 may be used to provide transmissions to and/or receive transmissions from antenna 121, while other transceivers of electronic device 110 may be provided to provide transmissions to and/or receive transmissions from antenna 101 and antenna 103. Generally, multiple receivers, transmitters, and/or transceivers may be provided in an electronic device—one in communication with each of the antennas of the electronic device. The transmissions may be in accordance with any of a variety of protocols, including, but not limited to 5G signals, and/or a variety of modulation/demodulation schemes may be used, including, but not limited to: orthogonal frequency division multiplexing (OFDM), filter bank multi-carrier (FBMC), the generalized frequency division multiplexing (GFDM), universal filtered multi-carrier (UFMC) transmission, bi orthogonal frequency division multiplexing (BFDM), sparse code multiple access (SCMA), non-orthogonal multiple access (NOMA), multi-user shared access (MUSA) and faster-than-Nyquist (FTN) signaling with time-frequency packing. In some examples, the transmissions may be sent, received, or both, in accordance with 5G protocols and/or standards.

Examples of transmitters, receivers, and/or transceivers described herein, such as the wireless transmitter 131 and the wireless transmitter 111 may be implemented using a variety of components, including, hardware, software, firmware, or combinations thereof. For example, transceivers, transmitters, or receivers may include circuitry and/or one or more processing units (e.g. processors) and memory encoded with executable instructions for causing the transceiver to perform one or more functions described herein (e.g. software).

Figure 2:
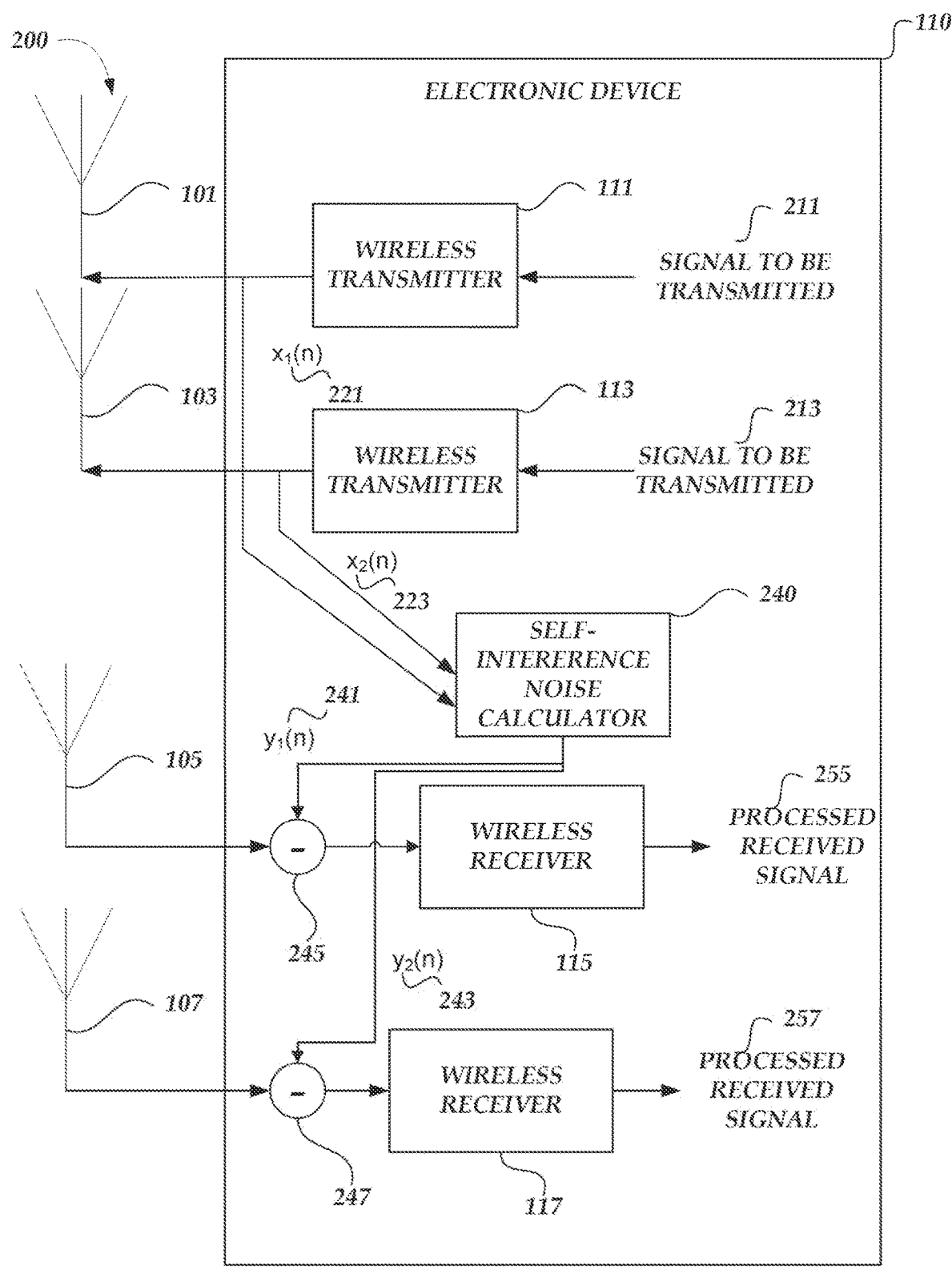
FIG. 2 is a schematic illustration of an electronic device arranged in accordance with examples described herein.

FIG. 2 is a schematic illustration 200 of an electronic device 110 arranged in accordance with examples described herein. The electronic device 110 may also include self-interference noise calculator 240, compensation component 245, and compensation component 247. Self-interference noise calculator 240 and wireless transmitter 111, 113 may be in communication with one another. Each wireless transmitter 111, 113 may be in communication with a respective antenna, such as antenna 101, antenna 103. Each wireless transmitter 111, 113 receives a respective signal to be transmitted, such as signals to be transmitted 211, 213. The wireless receivers 115, 117 may process the signals to be transmitted 211, 213 with the operations of a radio-frequency (RF) front-end to generate transmitter output data $x_1(n)$, $x_2(n)$ 221, 223. The wireless transmitter 111, 113 may process the signals to be transmitted 211, 213 as a wireless transmitter 300, for example.

Self-interference noise calculator 240 and compensation components 245, 247 may be in communication with one another. Each wireless receiver may be in communication with a respective antenna, such as antenna 105, 107 and a respective compensation component, such as compensation component 245, 247. In some examples, a wireless transmission received at antennas 105, 107 may be communicated to wireless receiver 115, 117 after compensation of self-interference by the respective compensation component 245, 247. Each wireless receiver 115, 117 processes the received and compensated wireless transmission to produce a respective processed received signal, such as processed received signals 255, 257. In other examples, fewer, additional, and/or different components may be provided.

Examples of self-interference noise calculators described herein may generate and provide adjusted signals to compensation components. So, for example, the self-interference noise calculator 240 may generate adjusted signals $y_1(n)$, $y_2(n)$ 241, 243 and provide such adjusted signals to the compensation components 245, 247. The self-interference noise calculator 240 may generate such adjusted signals $y_1(n)$, $y_2(n)$ 241, 243 based on transmitter output data $x_1(n)$, $x_2(n)$ 221, 223. The self-interference noise calculator 240 may be in communication with multiple (e.g. all) of the wireless transmitters of the electronic device 110 and all the respective compensation components coupled to respective wireless receivers, and may provide adjusted signals based on transmitter output data.

It may be desirable in some examples to compensate for the self-interference noise to achieve full duplex transmission. For example, it may be desirable for wireless transmitters 111, 113 of the electronic device 110 to transmit wireless transmission signals at a certain frequency band; and, at the same time or simultaneously, wireless receivers 105, 107 receive wireless transmission signals on that same frequency band. The self-interference noise calculator 240 may determine the self-interference contributed from each wireless transmission based on the transmitter output data to compensate each received wireless transmission with an adjusted signal $y_1(n)$, $y_2(n)$ 241, 243. Particularly as wireless communications move toward 5G standards, efficient use of wireless spectra may become increasingly important.

Examples of self-interference noise calculators described herein may provide the adjusted signals $y_1(n)$, $y_2(n)$ 241, 243 to receiver(s) and/or transceiver(s). Compensation components 245, 247 may receive the adjusted signals $y_1(n)$, $y_2(n)$ 241, 243 and compensate an incoming received wireless transmission from antennas 105, 1.07. For example, the compensation components 245, 247 may combine the adjusted signals with the incoming received wireless transmission in a manner which compensates for (e.g. reduces) self-interference. In some examples, the compensation components 245, 247 may subtract the adjusted signals $y_1(n)$, $y_2(n)$ 241, 243 from the received wireless transmission to produce compensated received signals for the respective wireless receivers 115, 117. The compensation components 245, 247 may communicate the compensated received signals to the wireless receivers 115, 117. The wireless receivers 115, 117 may process the compensated received signal with the operations of a radio-frequency (RF) front-end. The wireless receiver may process the compensated received signals as a wireless receiver 400, for example. While the compensation components 245, 247 have been described in terms of subtracting an adjusting signal from a received wireless transmission, it can be appreciated that various compensations may be possible, such as adjusted signal that operates as a transfer function compensating the received wireless transmission or an adjusted signal that operates as an optimization vector to multiply the received wireless transmission. Responsive to such compensation, electronic device 110 may transmit and receive wireless communications signals in a full duplex transmission mode.

Examples of self-interference noise calculators described herein, including the self-interference noise calculator 240 of FIG. 2 may be implemented using hardware, software, firmware, or combinations thereof. For example, self-interference noise calculator 240 may be implemented using circuitry and/or one or more processing unit(s) (e.g. processors) and memory encoded with executable instructions for causing the self-interference noise calculator to perform one or more functions described herein.

Figure 3:
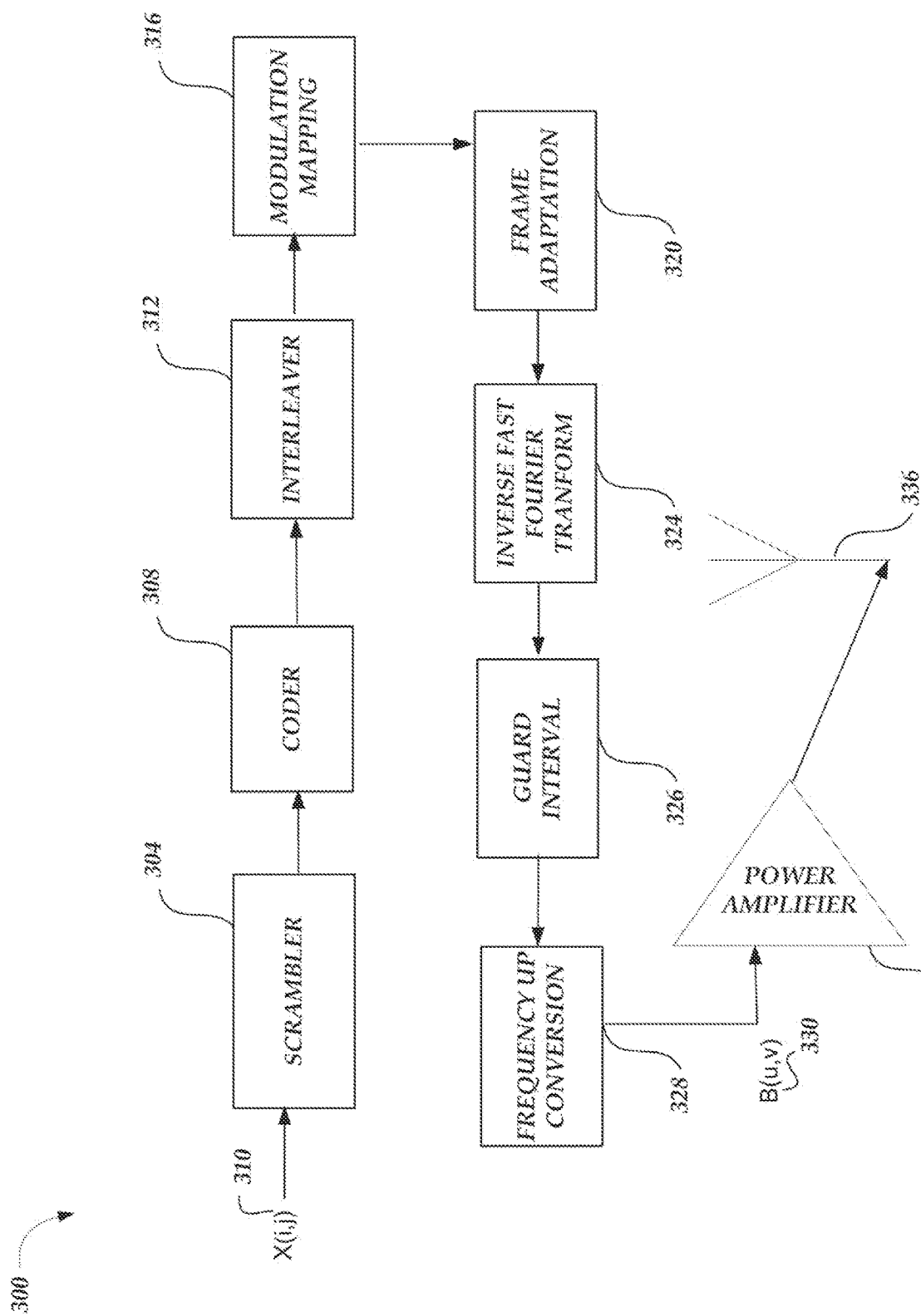
FIG. 3 is a schematic illustration of a wireless transmitter.

FIG. 3 is a schematic illustration of a wireless transmitter 300. The wireless transmitter 300 receives a data signal 310 and performs operations to generate wireless communication signals for transmission via the antenna 336. The wireless transmitter 300 may be utilized to implement the electronic device 110 of FIG. 1 as a wireless transmitter, for example. The transmitter output data xN(n) 310 is amplified by a power amplifier 332 before the output data are transmitted on an RF antenna 336. The operations to the RF-front end may generally be performed with analog circuitry or processed as a digital baseband operation for implementation of a digital front-end. The operations of the RF-front end include a scrambler 304, a coder 308, an interleaver 312, a modulation mapping 316, a frame adaptation 320, an IFFT 324, a guard interval 326, and frequency up-conversion 328.

The scrambler 304 may convert the input data to a pseudo-random or random binary sequence. For example, the input data may be a transport layer source (such as MPEG-2 Transport stream and other data) that is converted to a Pseudo Random Binary Sequence (PRBS) with a generator polynomial. While described in the example of a generator polynomial, various scramblers 304 are possible.

The coder 308 may encode the data outputted from the scrambler to code the data. For example, a Reed-Solomon (RS) encoder, turbo encoder may be used as a first coder to generate a parity block for each randomized transport packet fed by the scrambler 304. In some examples, the length of parity block and the transport packet can vary according to various wireless protocols. The interleaver 312 may interleave the parity blocks output by the coder 308, for example, the interleaver 312 may utilize convolutional byte interleaving. In some examples, additional coding and interleaving can be performed after the coder 308 and interleaver 312. For example, additional coding may include a second coder that may further code data output from the interleaver, for example, with a punctured convolutional coding having a certain constraint length. Additional interleaving may include an inner interleaver that forms groups of joined blocks. While described in the context of a RS coding, turbo coding, and punctured convolution coding, various coders 308 are possible, such as a low-density parity-check (LDPC) coder or a polar coder. While described in the context of convolutional byte interleaving, various interleavers 312 are possible.

The modulation mapping 316 may modulate the data output from the interleaver 312. For example, quadrature amplitude modulation (QAM) may be used to map the data by changing (e.g., modulating) the amplitude of the related carriers. Various modulation mappings may be used, including, but not limited to: Quadrature Phase Shift Keying (QPSK), SCMA NOMA, and MUSA (Multi-user Shared Access). Output from the modulation mapping 316 may be referred to as data symbols. While described in the context of QAM modulation, various modulation mappings 316 are possible. The frame adaptation 320 may arrange the output from the modulation mapping according to bit sequences that represent corresponding modulation symbols, carriers, and frames.

The IFFT 324 may transform symbols that have been framed into sub-carriers (e.g., by frame adaptation 320) into time-domain symbols. Taking an example of a 5G wireless protocol scheme, the IFFT can be applied as N-point IFFT:

$$x_k = \sum_{n=1}^{N} X_n e^{j2\pi kn/N} \tag{1}$$

where Xn is the modulated symbol sent in the nth 5G sub-carrier. Accordingly, the output of the IFFT 324 may form time-domain 5G symbols. In some examples, the IFFT 324 may be replaced by a pulse shaping filter or poly-phase filtering banks to output symbols for frequency up-conversion 328.

In the example of FIG. 3, the guard interval 326 adds a guard interval to the time-domain 5G symbols. For example, the guard interval may be a fractional length of a symbol duration that is added, to reduce inter-symbol interference, by repeating a portion of the end of a time-domain 5G symbol at the beginning of the frame. For example, the guard interval can be a time period corresponding to the cyclic prefix portion of the 5G wireless protocol scheme.

The frequency up-conversion 328 may up-convert the time-domain 5G symbols to a specific radio frequency. For example, the time-domain 5G symbols can be viewed as a baseband frequency range and a local oscillator can mix the frequency at which it oscillates with the 5G symbols to generate 5G symbols at the oscillation frequency. A digital up-converter (DUC) may also be utilized to convert the time-domain 5G symbols. Accordingly, the 5G symbols can be up-converted to a specific radio frequency for an RF transmission.

Before transmission, at the antenna 336, a power amplifier 332 may amplify the transmitter output data xN(n) 310 to output data for an RF transmission in an RF domain at the antenna 336. The antenna 336 may be an antenna designed to radiate at a specific radio frequency. For example, the antenna 336 may radiate at the frequency at which the 5G symbols were up-converted. Accordingly, the wireless transmitter 300 may transmit an RF transmission via the antenna 336 based on the data signal 310 received at the scrambler 304. As described above with respect to FIG. 3, the operations of the wireless transmitter 300 can include a variety of processing operations. Such operations can be implemented in a conventional wireless transmitter, with each operation implemented by specifically-designed hardware for that respective operation. For example, a DSP processing unit may be specifically-designed to implement the IFFT 324. As can be appreciated, additional operations of wireless transmitter 300 may be included in a conventional wireless receiver.

FIG. 4 is a schematic illustration of wireless receiver 400. The wireless receiver 400 receives input data X (i,j) 410 from an antenna 404 and performs operations of a wireless receiver to generate receiver output data at the descrambler 444. The wireless receiver 400 may be utilized to implement the electronic device 110 of FIG. 1 as a wireless receiver, for example. The antenna 404 may be an antenna designed to receive at a specific radio frequency. The operations of the wireless receiver may be performed with analog circuitry or processed as a digital baseband operation for implementation of a digital front-end. The operations of the wireless receiver include a frequency down-conversion 412, guard interval removal 416, a fast Fourier transform 420, synchronization 424, channel estimation 428, a demodulation mapping 432, a deinterleaver 436, a decoder 440, and a descrambler 444.

The frequency down-conversion 412 may down-convert the frequency domain symbols to a baseband processing range. For example, continuing in the example of a 5G implementation, the frequency-domain 5G symbols may be mixed with a local oscillator frequency to generate 5G symbols at a baseband frequency range. A digital down-converter (DDC) may also be utilized to convert the frequency domain symbols. Accordingly, the RF transmission including time-domain 5G symbols may be down-converted to baseband. The guard interval removal 416 may remove a guard interval from the frequency-domain 5G symbols. The FFT 420 may transform the time-domain 5G symbols into frequency-domain 5G symbols. Taking an example of a 5G wireless protocol scheme, the FFT can be applied as N-point FFT:

$$X_n = \sum_{k=1}^{N} x_k e^{-j2\pi kn/N} \quad (2)$$

where Xn is the modulated symbol sent in the nth 5G sub-carrier. Accordingly, the output of the FFT 420 may form frequency-domain 5G symbols. In some examples, the FFT 420 may be replaced by poly-phase filtering banks to output symbols for synchronization 424.

The synchronization 424 may detect pilot symbols in the 5G symbols to synchronize the transmitted data. In some examples of a 5G implementation, pilot symbols may be detected at the beginning of a frame (e.g., in a header) in the time-domain. Such symbols can be used by the wireless receiver 400 for frame synchronization. With the frames synchronized, the 5G symbols proceed to channel estimation 428. The channel estimation 428 may also use the time-domain pilot symbols and additional frequency-domain pilot symbols to estimate the time or frequency effects (e.g., path loss) to the received signal.

For example, a channel may be estimated according to N signals received through N antennas (in addition to the antenna 404) in a preamble period of each signal. In some examples, the channel estimation 428 may also use the guard interval that was removed at the guard interval removal 416. With the channel estimate processing, the channel estimation 428 may compensate for the frequency-domain 5G symbols by some factor to minimize the effects of the estimated channel. While channel estimation has been described in terms of time-domain pilot symbols and frequency-domain pilot symbols, other channel estimation techniques or systems are possible, such as a MIMO-based channel estimation system or a frequency-domain equalization system.

The demodulation mapping 432 may demodulate the data outputted from the channel estimation 428. For example, a quadrature amplitude modulation (QAM) demodulator can map the data by changing (e.g., modulating) the amplitude of the related carriers. Any modulation mapping described herein can have a corresponding demodulation mapping as performed by demodulation mapping 432. In some examples, the demodulation mapping 432 may detect the phase of the carrier signal to facilitate the demodulation of the 5G symbols. The demodulation mapping 432 may generate bit data from the 5G symbols to be further processed by the deinterleaver 436.

The deinterleaver 436 may deinterleave the data bits, arranged as parity block from demodulation mapping into a bit stream for the decoder 440, for example, the deinterleaver 436 may perform an inverse operation to convolutional byte interleaving. The deinterleaver 436 may also use the channel estimation to compensate for channel effects to the parity blocks.

The decoder 440 may decode the data outputted from the scrambler to code the data. For example, a Reed-Solomon (RS) decoder or turbo decoder may be used as a decoder to generate a decoded bit stream for the descrambler 444. For example, a turbo decoder may implement a parallel concatenated decoding scheme. In some examples, additional decoding and/or deinterleaving may be performed after the decoder 440 and deinterleaver 436. For example, additional decoding may include another decoder that may further decode data output from the decoder 440. While described in the context of a RS decoding and turbo decoding, various decoders 440 are possible, such as low-density parity-check (LDPC) decoder or a polar decoder.

The descrambler 444 may convert the output data from decoder 440 from a pseudo-random or random binary sequence to original source data. For example, the descrambler 44 may convert decoded data to a transport layer destination (e.g., MPEG-2 transport stream) that is descrambled with an inverse to the generator polynomial of the scrambler 304. The descrambler thus outputs receiver output data. Accordingly, the wireless receiver 400 receives an RF transmission including input data X (i,j) 410 via to generate the receiver output data.

As described herein, for example with respect to FIG. 4, the operations of the wireless receiver 400 can include a variety of processing operations. Such operations can be implemented in a conventional wireless receiver, with each operation implemented by specifically-designed hardware for that respective operation. For example, a DSP processing unit may be specifically-designed to implement the FFT 420. As can be appreciated, additional operations of wireless receiver 400 may be included in a conventional wireless receiver.

Figure 5A:
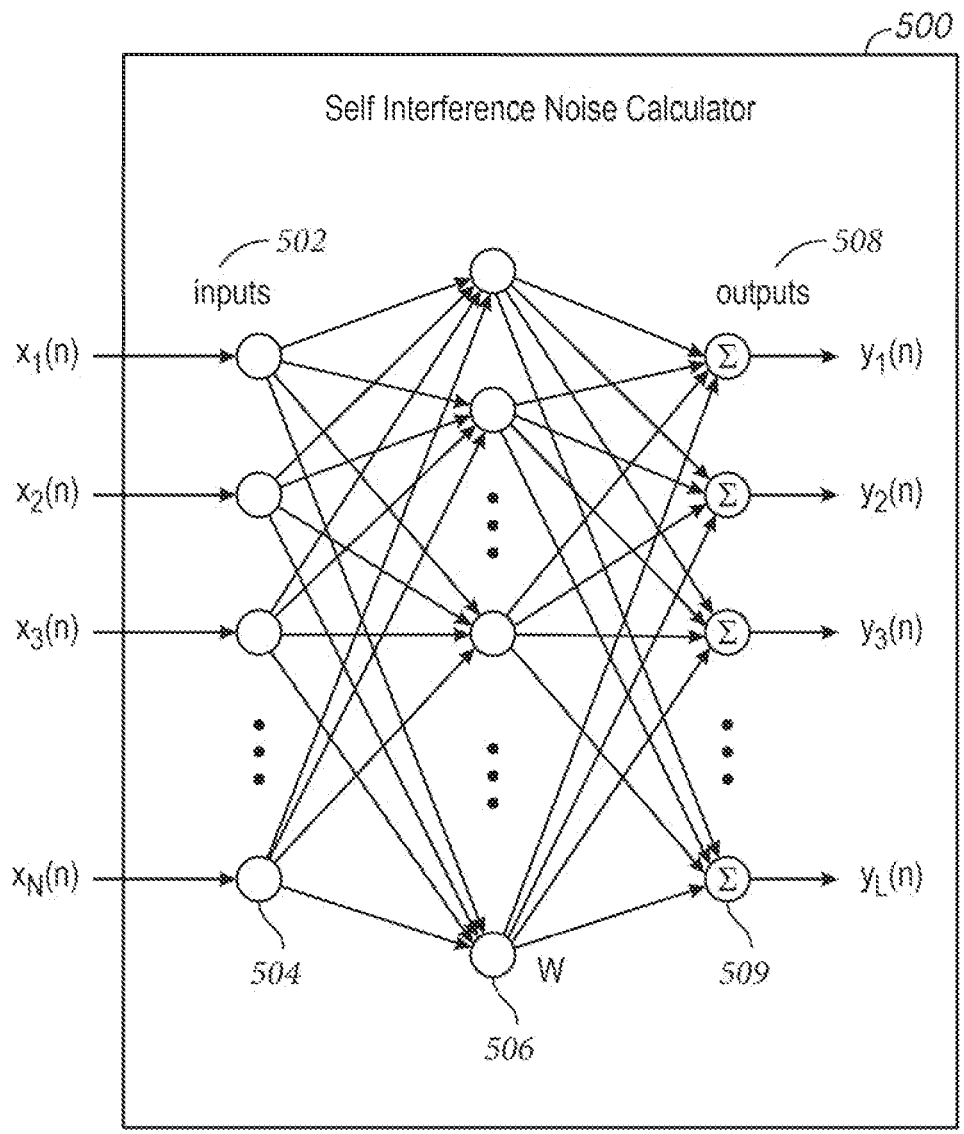
FIG. 5A is a schematic illustration of an example self-interference noise calculator arranged as a neural network in accordance with examples described herein.

FIG. 5A is a schematic illustration of an example self-interference noise calculator 500 arranged in accordance with examples described herein. The self-interference noise calculator 500 may be utilized to implement the self-interference noise calculator of FIG. 2 or the self-interference noise calculator 640 of FIG. 6, for example. The self-interference noise calculator 500 may be referred to as a neural network, e.g., a neural network that calculates self-interference noise. The self-interference noise calculator 500 includes a network of processing elements 504, 506, 509 that output adjusted signals $y_1(n)$, $y_2(n)$, $y_3(n)$, $y_L(n)$ 508 based on transmitter output data $x_1(n)$, $x_2(n)$, $x_3(n)$, $x_N(n)$ 502. For example, the transmitter output data $x_1(n)$, $x_2(n)$, $x_3(n)$, $x_N(n)$ 502 may correspond to inputs for respective antennas of each transmitter generating the respective $x_1(n)$, $x_2(n)$, $x_3(n)$, $x_N(n)$ 502. The processing elements 504 receive the transmitter output data $x_1(n)$, $x_2(n)$, $x_3(n)$, $x_N(n)$ 502 as inputs. The processing elements 504 may be implemented, for example, using bit manipulation units that may forward the transmitter output data $x_1(n)$, $x_2(n)$, $x_3(n)$, $x_N(n)$ 502 to processing elements 506. Processing elements 506 may be implemented, for example, using multiplication units that include a non-linear vector set (e.g., center vectors) based on a non-linear function, such as a Gaussian function $$f(r) = \exp\left(-\frac{r^2}{\sigma^2}\right),$$

a multi-quadratic function (e.g., $f(r)=(r^2+\sigma^2)$), an inverse multi-quadratic function (e.g., $f(r)=(r^2+\sigma^2)$), a thin-plate spine function (e.g., $f(r)=r^2 \log(r)$), a piece-wise linear function (e.g., $$f(r) = \frac{1}{2}(|r+1|-|r+1|),$$

or a cubic approximation function (e.g., $$f(r) = \frac{1}{2}(|r^3+1|-|r^3+1|)).$$

In some examples, the parameter a is a real parameter (e.g., a scaling parameter) and r is the distance between the input signal (e.g., $x_1(n)$, $x_2(n)$, $x_3(n)$, $x_N(n)$ 502) and a vector of the non-linear vector set. Processing elements 509 may be implemented, for example, using accumulation units that sum the intermediate processing results received from each of the processing elements 506. In communicating the intermediate processing results, each intermediate processing result may be weighted with a weight 'W'. For example, the multiplication processing units may weight the intermediate processing results based on a minimized error for the all or some of the adjustment signals that may generated by a self-interference noise calculator.

The processing elements 506 include a non-linear vector set that may be denoted as $C_i$ (for i=1, 2, . . . H). H may represent the number of processing elements 506. With the transmitter output data $x_1(n)$, $x_2(n)$, $x_3(n)$, $x_N(n)$ 502 received as inputs to processing elements 506, after forwarding by processing elements 504, the output of the processing elements 506, operating as multiplication processing units, may be expressed as $h_i(n)$, such that:

$$h_i(n)=f_i(\|X(n)-C_i\|)(i=1,2,\ldots H) \quad (3)$$

$f_i$ may represent a non-linear function that is applied to the magnitude of the difference between $x_1(n)$, $x_2(n)$, $x_3(n)$, $x_N(n)$ 502 and the center vectors $C_i$. The output $h_i(n)$ may represent a non-linear function such as a Gaussian function, multi-quadratic function, an inverse multi-quadratic function, a thin-plate spine function, or a cubic approximation function.

The output $h_i(n)$ of the processing elements 506 may be weighted with a weight matrix 'W'. The output $h_i(n)$ of the processing elements 506 can be referred to as intermediate processing results of the self-interference noise calculator 500. For example, the connection between the processing elements 506 and processing elements 509 may be a linear function such that the summation of a weighted output $h_i(n)$ such that the adjusted signals $y_1(n)$, $y_2(n)$, $y_3(n)$, $y_L(n)$ 508 may be expressed, in Equation 4 as:

$$y_i(n) = \sum_{j=1}^{H} W_{ij} h_j(n) = \sum_{j=1}^{H} W_{ij} f_j(\|X(n)-C_j\|) \quad (4)$$

$$(i = 1, 2, \ldots, L)$$

Accordingly, the adjusted signals $y_1(n)$, $y_2(n)$, $y_3(n)$, $y_L(n)$ 508 may be the output $y_i(n)$ of the i'th processing element 509 at time n, where L is the number of processing elements 509. $W_{ij}$ is the connection weight between j'th processing element 506 and i'th processing element 509 in the output layer. As described with respect to FIG. 6, the center vectors $C_i$ and the connection weights $W_{ij}$ of each layer of processing elements may be determined by a training unit 650 that utilizes sample vectors 660 to train a self-interference calculator 640. Advantageously, the adjusted signals $y_1(n)$, $y_2(n)$, $y_3(n)$, $y_L(n)$ 508 generated from the transmitter output data $x_1(n)$, $x_2(n)$, $x_3(n)$, $x_N(n)$ 502 may be computed with near-zero latency such that self-interference compensation may be achieved in any electronic device including a self-interference noise calculator, such as the self-interference noise calculator 500. A wireless device or system that implements a self-interference noise calculator 500 may achieve full duplex transmission. For example, the adjusted signals generated by the interference noise calculator 500 may compensate-interference that an antenna of the wireless device or system will experience due to transmission signals (e.g., transmitter output data) by another antenna of the wireless device or system.

While the self-interference noise calculator 500 has been described with respect to a single layer of processing elements 506 that include multiplication units, it can be appreciated that additional layers of processing elements with multiplication units may be added between the processing elements 504 and the processing elements 509. The self-interference noise calculator is scalable in hardware form, with additional multiplication units being added to accommodate additional layers. Using the methods and systems described herein, additional layer(s) of processing elements including multiplication processing units and the processing elements 506 may be optimized to determine the center vectors $C_i$ and the connection weights $W_{ij}$ of each layer of processing elements including multiplication units. In some implementations, for example as described with reference to FIGS. 5C-5E, layers of processing elements 506 may include multiplication/accumulation (MAC) units, with each layer having additional MAC units. Such implementations, having accumulated the intermediate processing results in a respective processing elements (e.g., the respective MAC unit), may also include memory look-up (MLU) units that are configured to retrieve a plurality of coefficients and provide the plurality of coefficients as the connection weights for the respective layer of processing elements 506 to be mixed with the input data.

The self-interference noise calculator 500 can be implemented using one or more processors, for example, having any number of cores. An example processor core can include an arithmetic logic unit (ALU), a bit manipulation unit, a multiplication unit, an accumulation unit, a multiplication/accumulation (MAC) unit, an adder unit, a look-up table unit, a memory look-up unit, or any combination thereof. In some examples, the self-interference noise calculator 240 may include circuitry, including custom circuitry, and/or firmware for performing functions described herein. For example, circuitry can include multiplication unit, accumulation units, MAC units, and/or bit manipulation units for performing the described functions, as described herein. The self-interference noise calculator 240 may be implemented in any type of processor architecture including but not limited to a microprocessor or a digital signal processor (DSP), or any combination thereof.

Figure 5B:
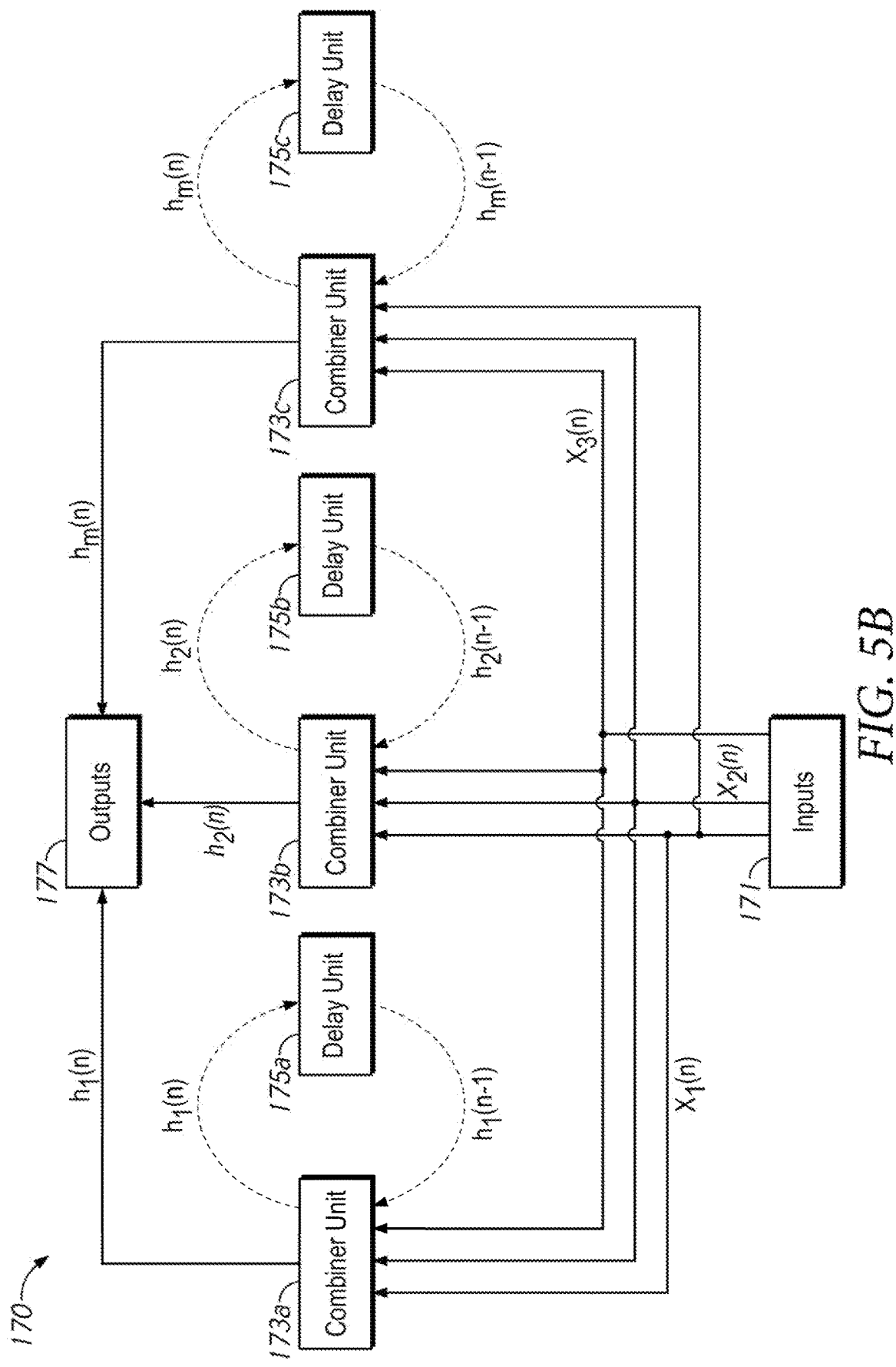
FIG. 5B is a schematic illustration of a recurrent neural network arranged in accordance with examples described herein.

FIG. 5B is a schematic illustration of a recurrent neural network arranged in accordance with examples described herein. The recurrent neural network 170 include three stages (e.g., layers): an inputs stage 171; a combiner stage 173 and 175, and an outputs stage 177. While three stages are shown in FIG. 5B, any number of stages may be used in other examples, e.g., as described with reference to FIGS. 5C-5E. In some implementations, the recurrent neural network 170 may have multiple combiner stages such that outputs from one combiner stage is provided to another combiners stage, until being providing to an outputs stage 177. As described with reference to FIG. 5C, for example, there may be multiple combiner stages in a neural network 170. As depicted in FIG. 5B, the delay units 175a, 175b, and 175c may be optional components of the neural network 170. When such delay units 175a, 175b, and 175c are utilized as described herein, the neural network 170 may be referred to as a recurrent neural network.

The first stage of the neural network 170 includes inputs node 171. The inputs node 171 may receive input data at various inputs of the recurrent neural network. The second stage of the neural network 170 is a combiner stage including combiner units 173a, 173b, 173c; and delay units 175a, 175b, 175c. Accordingly, the combiner units 173 and delay units 175 may be collectively referred to as a stage of combiners. Accordingly, as described with respect to FIG. 5C with processing units 512 implementing such combiners, generally processing units 512 that implement the combiner units 173a-c and delay units 175a-c in the second stage may perform a nonlinear activation function using the input data from the inputs node 171 (e.g., input signals X1(n), X2(n), and X3(n)). The third stage of neural network 170 includes the outputs node 177. Additional, fewer, and/or different components may be used in other examples. As described with analogous elements of the self-interference noise calculator 500 of FIG. 5A, the recurrent neural network 170 may also implement a self-interference noise calculator, as described with respect to the processing units 512 of FIGS. 5C-5E that may calculate self-interference noise, implementing a recurrent neural network 170. As such, the implementations of FIGS. 5C-5E may be referred to as recurrent self-interference noise calculators.

The recurrent neural network 170 includes delay units 175a, 175b, and 175c, which generate delayed versions of the output from the respective combiner units 173a-c based on receiving such output data from the respective combiner units 173a-c. In the example, the output data of combiner units 173a-c may be represented as h(n); and, accordingly, each of the delay units 175a-c delay the output data of the combiner units 173a-c to generate delayed versions of the output data from the combiner units 173a-c, which may be represented as h(n-t). In various implementations, the amount of the delay, t, may also vary, e.g., one clock cycle, two clock cycles, or one hundred clock cycles. That is, the delay unit 175 may receive a clock signal and utilize the clock signal to identify the amount of the delay. In the example of FIG. 5B, the delayed versions are delayed by one time period, where '1' represents a time period. A time period may corresponds to any number of units of time, such as a time period defined by a clock signal or a time period defined by another element of the neural network 170.

Continuing in the example of FIG. 5B, each delay unit 175a-c provides the delayed versions of the output data from the combiner units 173a-c as input to the combiner units 173a-c, to operate, optionally, as a recurrent neural network. Such delay units 175a-c may provide respective delayed versions of the output data from nodes of the combiner units 173a-c to respective input units/nodes of the combiner units 173a-c. In utilizing delayed versions of output data from combiner units 173a-c, the recurrent neural network 170 may train weights at the combiner units 173a-c that incorporate time-varying aspects of input data to be processed by such a recurrent neural network 170. Once trained, in some examples, the inputs node 171 receives wireless input data that is to be received and processed in the recurrent neural network 170 as a wireless receiver associated with a wireless protocol. Each stream of input data may correspond to a signal to be transmitted (e.g., the transmitter output data) at corresponding antennas (e.g., antennas 101 and 103 FIG. 1). Accordingly, because an RNN 170 incorporates the delayed versions of output data from combiner units 173a-c, the time-varying nature of the input data may provide faster and more efficient processing of the input data.

Generally, a recurrent neural network may include multiple stages of nodes. The nodes may be implemented using processing units (e.g., processing units 512) which may execute one or more functions on inputs received from a previous stage and provide the output of the functions to the next stage of the recurrent neural network. The processing units may be implemented using, for example, one or more processors, controllers, and/or custom circuitry, such as an application specific integrated circuit (ASIC) and/or a field programmable gate array (FPGA). In some examples, the processing units may be implemented using any combination of one or more processing units 512 described with respect to FIGS. 5C-5E. The processing units may be implemented as combiners and/or summers and/or any other structure for performing functions allocated to the processing unit. In some examples, certain of the elements of neural networks described herein perform weighted sums, e.g., may be implemented using one or more multiplication/accumulation units, which may be implemented using processor(s) and/or other circuitry. In an example, the neural network 170 may be implemented by the electronic device 110 utilizing any combination of one or more processing units described with respect to FIGS. 5C-5E.

Examples of recurrent neural network training and inference can be described mathematically. Again, as an example, consider input data at a time instant (n), given as: $X(n)=[x_1(n), x_2(n), \ldots x_m(n)]_r$. The center vector for each element in hidden layer(s) of the recurrent neural network 170 (e.g., combiner units 173a-c) may be denoted as $C_i$ (f or $i=1, 2, \ldots, H$, where H is the element number in the hidden layer).

The output of each element in a hidden layer may then be given as:

$$h_i(n) = f_i(\|X(n) + h_i(n-t) - C_i\|) \text{ for } (i=1,2,\ldots,H) \quad (5)$$

t may be the delay at the delay unit 175 such that the output of the combiner units 173 includes a delayed version of the output of the combiner units 173. In some examples, this may be referred to as feedback of the combiner units 173. Accordingly, each of the connections between a last hidden layer and the output layer may be weighted. Each element in the output layer may have a linear input-output relationship such that it may perform a summation (e.g., a weighted summation). Accordingly, an output of the i'th element in the output layer at time n may be written as:

$$y_i(n) = \sum_{j=1}^{H} W_{ij} h_j(n) + W_{ij} h_j(n-t) = \sum_{j=1}^{H} W_{ij} f_j(\|X(n) + h_i(n-t) - C_j\|) \quad (6)$$

for (i=1, 2, . . . , L) and where L is the element number of the output of the output layer and $W_{ij}$ is the connection weight between the j'th element in the hidden layer and the i'th element in the output layer.

Additionally or alternatively, while FIG. 5B has been described with respect to a single stage of combiners (e.g., second stage) including the combiner units 173a-c and delay units 175a-c, it can be appreciated that multiple stages of similar combiner stages may be included in the neural network 170 with varying types of combiner units and varying types of delay units with varying delays, for example, as will now be described with reference to FIGS. 5C-5E.

Figure 5C:
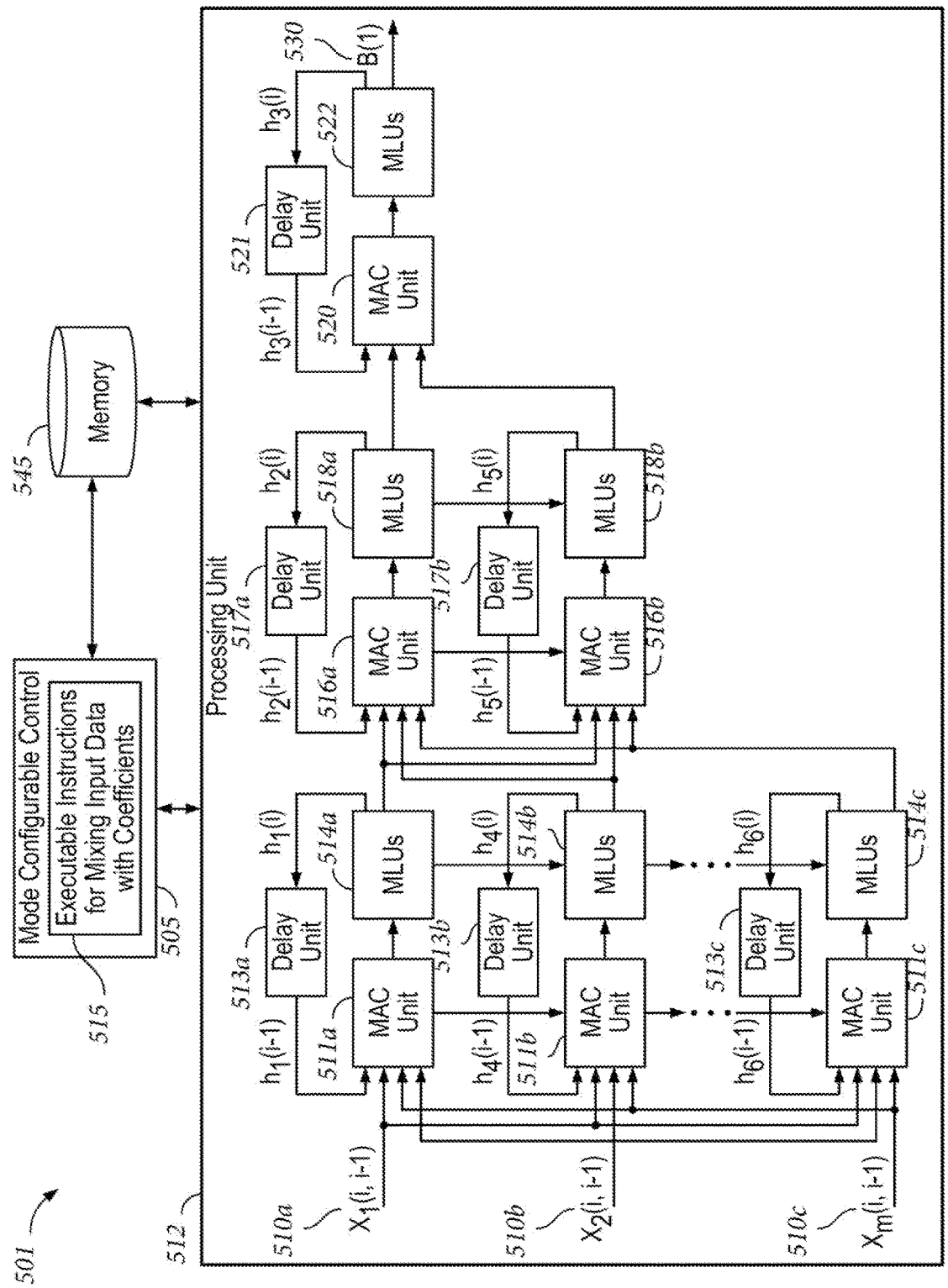
FIGS. 5C-5E are schematic illustrations of example self-interference noise calculators arranged as recurrent neural networks in accordance with examples described herein.

FIG. 5C is a schematic illustration of a processing unit 512 arranged in a system 501 in accordance with examples described herein. Such a hardware implementation (e.g., system 501) may be used, for example, to implement one or more neural networks, such as the self-interference noise calculator 240 of FIG. 2, self-interference noise calculator 500 of FIG. 5A or recurrent neural network 170 of FIG. 5B. Additionally or alternatively, in some implementations, the processing unit 512 may receive input data 510a, 510b, and 510c from such a computing system. The input data 510a, 510b, and 510c may be data to be transmitted, which may be stored in a memory 545. In some examples, data stored in the memory 545 may be input data to be transmitted from a plurality of antennas coupled to an electronic device 110 in which the processing unit 512 is implemented. In an example in which the electronic device 110 is coupled to the plurality of antennas 101 and 103, the input data 510a $X_1$(i, i−1) may correspond to a first RF transmission to be transmitted at the antenna 101 at a first frequency; the input data 510b $X_2$(i, i−1) may correspond to a second RF transmission to be transmitted at the antenna 103 at a second frequency; and the input data 510c $X_m$(i, i−1) may correspond to a m'th RF transmission to be transmitted at an m'th antenna at a m'th frequency. m may represent the number of antennas, with each antenna transmitting a portion of input data.

In some examples, m may also correspond to a number of wireless channels over which the input data is to be transmitted; for example, in a MIMO transmission, an RF transmission may be sent over multiple wireless channels at the plurality of antennas 101 and 103. In an example of the input data being received (in contrast to being transmitted), the input data 510a, 510b, 510c may corresponds to portions of input data to be processed as an RF transmission received at multiple antennas. For example, the output data 530 B(1) may be a MIMO output signal received at the antennas 101 and 103 at an electronic device that is implementing the processing unit 512 of the computing system 501. As denoted in the representation of the input data signals, the input data 510a $X_1$(i, i−1) includes a current portion of the input data, at time i, and a previous portion of the input data, at time i−1. For example, a current portion of the input data may be a sample obtained at the antenna 101 at a certain time period (e.g., at time i), while a previous portion of the input data may be a sample obtained at the antenna 101 at a time period previous to the certain time period (e.g., at time i−1). Accordingly, the previous portion of the input data may be referred to as a time-delayed version of the current portion of the input data. The portions of the input data at each time period may be obtained in a vector or matrix format, for example. In an example, a current portion of the input data, at time i, may be a single value; and a previous portion of the input data, at time i−1, may be a single value. Thus, the input data 510a $X_1$(i, i−1) may be a vector. In some examples, the current portion of the input data, at time i, may be a vector value; and a previous portion of the input data, at time i−1, may be a vector value. Thus, the input data 510a $X_1$(i, i−1) may be a matrix.

Such input data, which is obtained with a current and previous portion of input data, may be representative of a Markov process, such that a causal relationship between at least the current sample and the previous sample may improve the accuracy of weight estimation for training of coefficient data to be utilized by the MAC units and MLUs of the processing unit 512. As noted previously, the input data 510 may represent data to be transmitted (e.g., transmitter output data) at a first frequency and/or data to be transmitted at a first wireless channel. Accordingly, the input data 510b X2(i, i−1) may represent data to be transmitted at a second frequency or at a second wireless channel, including a current portion of the input data, at time i, and a previous portion of the input data, at time i−1. And, the number of input signals to be transmitted by the processing unit 512 may equal in some examples to a number of antennas coupled to an electronic device 110 implementing the processing unit 512. Accordingly, the input data 510c Xm(i, i−1) may represent data to be transmitted at a m'th frequency or at a m'th wireless channel, including a current portion of the input data, at time i, and a previous portion of the input data, at time i−1.

The processing unit 512 may include multiplication unit/accumulation (MAC) units 511a-c, 516a-b, and 520; delay units 513a-c, 517a-b, and 521; and memory lookup units (MLUs) 514a-c, 518a-b, and 522 that, when mixed with input data to be transmitted from the memory 545, may generate output data (e.g. B(1)) 530. Each set of MAC units and MLU units having different element numbers may be referred to as a respective stage of combiners for the processing unit 512. For example, a first stage of combiners includes MAC units 511a-c and MLUs 514a-c, operating in conjunction with delay units 513a-c, to form a first stage or "layer," as referenced with respect to FIG. 5A having "hidden" layers as various combiner stages. Continuing in the example, the second stage of combiners includes MAC units 516a-b and MLUs 518a-b, operating in conjunction with delay units 517a-b, to form a second stage or second layer of hidden layers. And the third stage of combiners may be a single combiner including the MAC unit 520 and MLU 522, operating in conjunction with delay unit 521, to form a third stage or third layer of hidden layers.

In an example of generating RF transmission for transmission, the output data 530 B(1) may be utilized as a MIMO RF signal to be transmitted at a plurality of antennas. In an example of obtaining RF transmission that were obtained at a plurality of antennas, the output data 530 B(1) may representative of a demodulated, decoded signal that was transmitted by another RF electronic device. In any case, the processing unit 512, may be provide instructions 515, stored at the mode configurable control 505, to cause the processing unit 512 to configure the multiplication units 511a-c, 516a-c, and 520 to multiply and/or accumulate input data 510a, 510b, and 510c and delayed versions of processing results from the delay units 513a-c, 517a-b, and 521 (e.g., respective outputs of the respective layers of MAC units) with coefficient data to generate the output data 530 B(1). For example, the mode configurable control 505 may execute instructions that cause the memory 545 to provide weights and/or other parameters stored in the memory 545, which may be associated with a certain wireless processing mode, to the MLUs 514a-c, 518a-b, and 522 as weights for the MAC units 511a-c, 516a-b, and 520 and delay units 513a-c, 517a-b, and 521. During operation, the mode configuration control 505 may be used to select weights and/or other parameters in memory 545 based on an indicated self-interference noise to calculate, e.g., the self-interference noise from a certain transmitting antenna to another transmitting antenna.

As denoted in the representation of the respective outputs of the respective layers of MAC units (e.g., the outputs of the MLUs 514a-c, 518a-b, and 522), the input data to each MAC unit 511a-c, 516a-b, and 520 includes a current portion of input data, at time i, and a delayed version of a processing result, at time i−1. For example, a current portion of the input data may be a sample obtained at the antenna 101 at a certain time period (e.g., at time i), while a delayed version of a processing result may be obtained from the output of the delay units 513a-c, 517a-b, and 521, which is representative of a time period previous to the certain time period (e.g., as a result of the introduced delay). Accordingly, in using such input data, obtained from both a current period and at least one previous period, output data B(1) 530 may be representative of a Markov process, such that a causal relationship between at least data from a current time period and a previous time period may improve the accuracy of weight estimation for training of coefficient data to be utilized by the MAC units and MLUs of the processing unit 512 or inference of signals to be transmitted in utilizing the processing unit 512. As noted previously, the input data 510 may represent transmitter output data $x_1(n)$, $x_2(n)$ 221, 223. Accordingly, the input data 510b X2(i, i−1) may represent transmitter output data $x_2(n)$ 223. And, the number of input signals obtained by the processing unit 512 may equal in some examples to a number of antennas coupled to an electronic device 110 implementing the processing unit 512. Accordingly, the input data 510c Xm(i, i−1) may represent data obtained at a m'th frequency or at a m'th wireless channel, including a current portion of the input data, at time i. Accordingly, in utilizing delayed versions of output data from 513a-c, 517a-b, and 521 the recurrent neural network 170 provides individualized frequency-band, time-correlation data for processing of signals to be transmitted.

In an example of executing such instructions 515 for mixing input data with coefficients, at a first layer of the MAC units 511a-c and MLUs 514a-c, the multiplication unit/accumulation units 511a-c are configured to multiply and accumulate at least two operands from corresponding input data 510a, 510b, or 510c and an operand from a respective delay unit 513a-c to generate a multiplication processing result that is provided to the MLUs 514a-c. For example, the multiplication unit/accumulation units 511a-c may perform a multiply-accumulate operation such that three operands, M N, and T are multiplied and then added with P to generate a new version of P that is stored in its respective MLU 514a-c. Accordingly, the MLU 514a latches the multiplication processing result, until such time that the stored multiplication processing result is be provided to a next layer of MAC units. The MLUs 514a-c, 518a-b, and 522 may be implemented by any number of processing elements that operate as a memory look-up unit such as a D, T, SR, and/or JK latches.

The MLUs 514a-c, 518a-b, and 522 shown in FIG. 5C may generally perform a predetermined nonlinear mapping from input to output. For example, the MLUs 514a-c, 518a-b, and 522 may be used to evaluate at least one non-linear function. In some examples, the contents and size of the various MLUs 514a-c, 518a-b, and 522 depicted may be different and may be predetermined. In some examples, one or more of the MLUs 514a-c, 518a-b, and 522 shown in FIG. 5C may be replaced by a single consolidated MLU (e.g., a table look-up). Examples of nonlinear mappings (e.g., functions) which may be performed by the MLUs 514a-c, 518a-b, and 522 include Gaussian functions, piecewise linear functions, sigmoid functions, thin-plate-spline functions, multi-quadratic functions, cubic approximations, and inverse multi-quadratic functions. Examples of functions have been described with reference also to FIG. 5A. In some examples, selected MLUs 514a-c, 518a-b, and 522 may be by-passed and/or may be de-activated, which may allow an MLU and its associated MAC unit to be considered a unity gain element.

Additionally in the example, the MLU 514a provides the processing result to the delay unit 513a. The delay unit 513a delays the processing result (e.g., h1(i)) to generate a delayed version of the processing result (e.g., h1(i−1)) to output to the MAC unit 511a as operand T. While the delay units 513a-c, 517a-b, and 521 of FIG. 5C are depicted introducing a delay of '1', it can be appreciated that varying amounts of delay may be introduced to the outputs of first layer of MAC units. For example, a clock signal that introduced a sample delay of '1' (e.g., h1(i−1)) may instead introduce a sample delay of '2', '4', or '100'. In various implementations, the delay units 513a-c, 517a-b, and 521 may correspond to any number of processing units that can introduce a delay into processing circuitry using a clock signal or other time-oriented signal, such as flops (e.g., D-flops) and/or one or more various logic gates (e.g., AND, OR, NOR, etc. . . . ) that may operate as a delay unit.

In the example of a first hidden layer of a recurrent neural network, the MLUs 514a-c may retrieve coefficient data stored in the memory 545, which may be weights associated with weights to be applied to the first layer of MAC units to both the data from the current period and data from a previous period (e.g., the delayed versions of first layer processing results). For example, the MLU 514a can be a table look-up that retrieves one or more coefficients (e.g., specific coefficients associated with a first frequency) to be applied to both operands M and N, as well as an additional coefficient to be applied to operand T. The MLUs 514a-c also provide the generated multiplication processing results to the next layer of the MAC units 516a-b and MLUs 518a-b. The additional layers of the MAC units 516a, 516b and MAC unit 520 working in conjunction with the MLUs 518a, 518b and MLU 522, respectively, may continue to process the multiplication results to generate the output data 530 B(n). Using such a circuitry arrangement, the output data 530 B(1) may be generated from the input data 510*a*, 510*b*, and 510*c*.

Figure 5D:
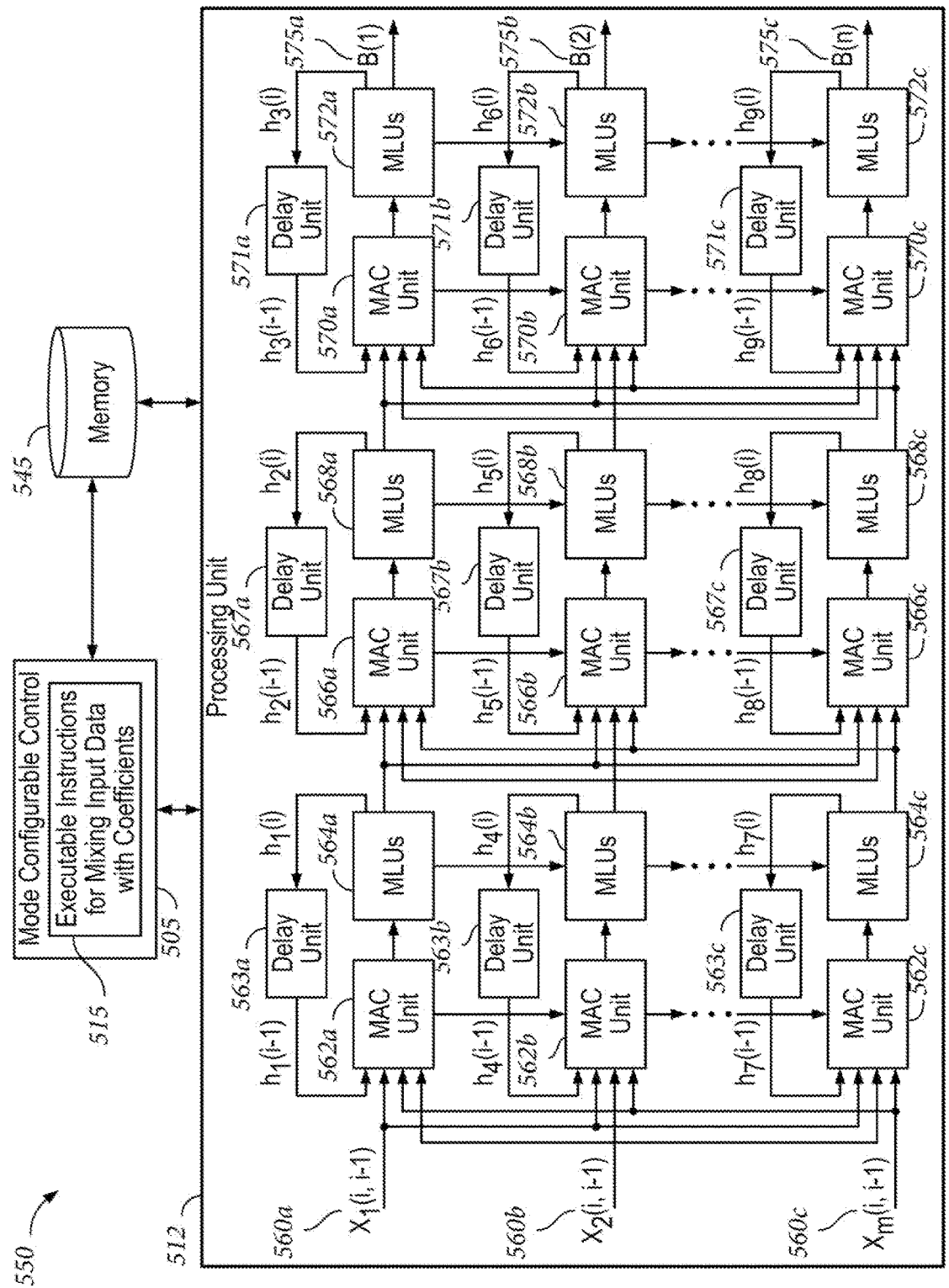

Advantageously, the processing unit 512 of system 501 may utilize a reduced number of MAC units and/or MLUs, e.g., as compared to the processing unit 512 of FIG. 5D. The number of MAC units and MLUs in each layer of the processing unit 512 is associated with a number of channels and/or a number of antennas coupled to a device in which the processing unit 512 is being implemented. For example, the first layer of the MAC units and MLUs may include m number of those units, where m represents the number of antennas, each antenna receiving a portion of input data. Each subsequent layer may have a reduced portion of MAC units, delay units, and MLUs. As depicted, in FIG. 5C for example, a second layer of MAC units 516*a-b*, delay unit 517*a-b*, and MLUs 518*a-b* may include m−1 MAC units and MLUs, when m=3. Accordingly, the last layer in the processing unit 512, including the MAC unit 520, delay unit 521, and MLU 522, includes only one MAC, one delay unit, and one MLU. Because the processing unit 512 utilizes input data 510*a*, 510*b*, and 510*c* that may represent a Markov process, the number of MAC units and MLUs in each subsequent layer of the processing unit may be reduced, without a substantial loss in precision as to the output data 530 B(1); for example, when compared to a processing unit 512 that includes the same number of MAC units and MLUs in each layer, like that of processing unit 512 of system 550.

The coefficient data, for example from memory 545, can be mixed with the input data 510*a*-510*c* and delayed version of processing results to generate the output data 530 B(1). For example, the relationship of the coefficient data to the output data 530 B(1) based on the input data 510*a-c* and the delayed versions of processing results may be expressed as:

$$B(1) = a^1 * f\left(\sum_{j=1}^{m-1} a^{(m-1)} = f_j\left(\sum_{j=1}^{m} a^{(m)} X_k(i)\right)\right) \quad (7)$$

where a(m), a(m−1), a1 are coefficients for the first layer of multiplication/accumulation units 511*a-c* and outputs of delay units 513*a-c*; the second layer of multiplication/accumulation units 516*a-b* and outputs of delay units 517*a-b*; and last layer with the multiplication/accumulation unit 520 and output of delay unit 521, respectively; and where ƒ(•) is the mapping relationship which may be performed by the memory look-up units 514*a-c* and 518*a-b*. As described above, the memory look-up units 514*a-c* and 518*a-b* retrieve coefficients to mix with the input data and respective delayed versions of each layer of MAC units. Accordingly, the output data may be provided by manipulating the input data and delayed versions of the MAC units with the respective multiplication/accumulation units using a set of coefficients stored in the memory. The set of coefficients may be associated with vectors representative of self-interference noise. For example, in the case of signals to be transmitted, each coefficient of a set of coefficients may be an individual vector of self-interference of a respective wireless path to a first transmitting antenna of the plurality of antennas from at least one other transmitting antenna of the plurality of transmitting antennas. The set of coefficients may be based on connection weights obtained from the training of a recurrent neural network (e.g., recurrent neural network 170). The resulting mapped data may be manipulated by additional multiplication/accumulation units and additional delay units using additional sets of coefficients stored in the memory associated with the desired wireless protocol. The sets of coefficients multiplied at each stage of the processing unit 512 may represent or provide an estimation of the processing of the input data in specifically-designed hardware (e.g., an FPGA).

Further, it can be shown that the system 501, as represented by Equation (7), may approximate any nonlinear mapping with arbitrarily small error in some examples and the mapping of system 501 may be determined by the coefficients a(m), a(m−1), a1. For example, if such coefficient data is specified, any mapping and processing between the input data 510*a*-510*c* and the output data 530 may be accomplished by the system 501. For example, the coefficient data may represent non-linear mappings of the input data 510*a-c* to the output data B(1) 530. In some examples, the non-linear mappings of the coefficient data may represent a Gaussian function, a piece-wise linear function, a sigmoid function, a thin-plate-spline function, a multi-quadratic function, a cubic approximation, an inverse multiquadratic function, or combinations thereof. In some examples, some or all of the memory look-up units 514*a-c*, 518*a-b* may be deactivated. For example, one or more of the memory look-up units 514*a-c*, 518*a-b* may operate as a gain unit with the unity gain. Such a relationship, as derived from the circuitry arrangement depicted in system 501, may be used to train an entity of the computing system 501 to generate coefficient data. For example, using Equation (7), an entity of the computing system 501 may compare input data to the output data to generate the coefficient data.

Each of the multiplication unit/accumulation units 511*a-c*, 516*a-b*, and 520 may include multiple multipliers, multiple accumulation unit, or and/or multiple adders. Any one of the multiplication unit/accumulation units 511*a-c*, 516*a-b*, and 520 may be implemented using an ALU. In some examples, any one of the multiplication unit/accumulation units 511*a-c*, 516*a-b*, and 520 can include one multiplier and one adder that each perform, respectively, multiple multiplications and multiple additions. The input-output relationship of a multiplication/accumulation unit 511*a-c*, 516*a-b*, and 520 may be represented as:

$$B_{out} = \sum_{i=1}^{I} C_i * B_{in}(i) \quad (8)$$

where "I" represents a number to perform the multiplications in that unit, $C_i$ the coefficients which may be accessed from a memory, such as memory 545, and $B_{in}(i)$ represents a factor from either the input data 510*a-c* or an output from multiplication unit/accumulation units 511*a-c*, 516*a-b*, and 520. In an example, the output of a set of multiplication unit/accumulation units, $B_{out}$, equals the sum of coefficient data, $C_i$ multiplied by the output of another set of multiplication unit/accumulation units, $B_{in}(i)$. $B_{in}(i)$ may also be the input data such that the output of a set of multiplication unit/accumulation units, $B_{out}$, equals the sum of coefficient data, $C_i$ multiplied by input data.

While described in FIG. 5C as a processing unit 512, it can be appreciated that the processing unit 512 may be implemented in or as any of the self-interference noise calculators described herein, in operation to cancel and/or compensate self-interference noise via the calculation of such noise as implemented in a recurrent neural network. In such implementations, recurrent neural networks may be used to reduce and/or improve errors which may be introduced by self-interference noise. Advantageously, with such an implementation, wireless systems and devices implementing such RNNs increase capacity of their respective wireless networks because additional data may be transmitted in such networks, which would not otherwise be transmitted due to the effects of self-interference noise.

FIG. 5D is a schematic illustration of a processing unit 512 arranged in a system 550 in accordance with examples described herein. Such a hardware implementation (e.g., system 550) may be used, for example, to implement one or more neural networks, such as the self-interference noise calculator 240 of FIG. 2, self-interference noise calculator 500 of FIG. 5A, or recurrent neural network 170 of FIG. 5B. Similarly described elements of FIG. 5D may operate as described with respect to FIG. 5C, but may also include additional features as described with respect to FIG. 5D. For example, FIG. 5D depicts MAC units 562a-c and delay units 563a-c that may operate as described with respect MAC units 511a-c and delay units 513a-c of FIG. 5C. Accordingly, elements of FIG. 5D, whose numerical indicator is offset by 50 with respect to FIG. 5C, include similarly elements of the processing element 512; e.g., MAC unit 566a operates similarly with respect to MAC unit 516a. The system 550, including processing element 512, also includes additional features not highlighted in the processing element 512 of FIG. 5C. For example, the processing unit 512 of FIG. 5D additionally includes MAC units 566c and 570b-c; delay units 567c and 571b-c; and MLUs 568c and 572b-c, such that the output data is provided as 575a-c, rather than as singularly in FIG. 5C as B(1) 530. Advantageously, the system 550 including a processing element 512 may process the input data 560a-c to generate the output data 575a-c with greater precision. For example, the output data 575a-c may process the input data 560a-560c with additional coefficient retrieved at MLU 568c and multiplied and/or accumulated by additional MAC units 566c and 570b-c and additional delay units 567c and 571b-c. For example, such additional processing may result in output data that is more precise with respect providing output data that estimates a vector representative of self-interference noise between two different antennas. In implementations where board space (e.g., a printed circuit board) is not a primary factor in design, implementations of the processing unit 512 of FIG. 5D may be desirable as compared to that of processing unit 512 of FIG. 5C; which, in some implementations may occupy less board space as a result of having fewer elements than the processing unit 512 of FIG. 5D.

Additionally or alternatively, the processing unit 512 of system 550 may also be utilized for applications in which each portion of the output data 575a-c is to be transmitted as a MIMO signal on a corresponding antenna. For example, the output data 575a may be transmitted as a portion of a MIMO transmission at a first antenna having a first frequency; the output data 575b may be transmitted as a second portion of a MIMO transmission at a second antenna having a second frequency; and the output data 575c may be transmitted as a n'th portion of the MIMO transmission at a n'th antenna having an n'th frequency.

Figure 5E:
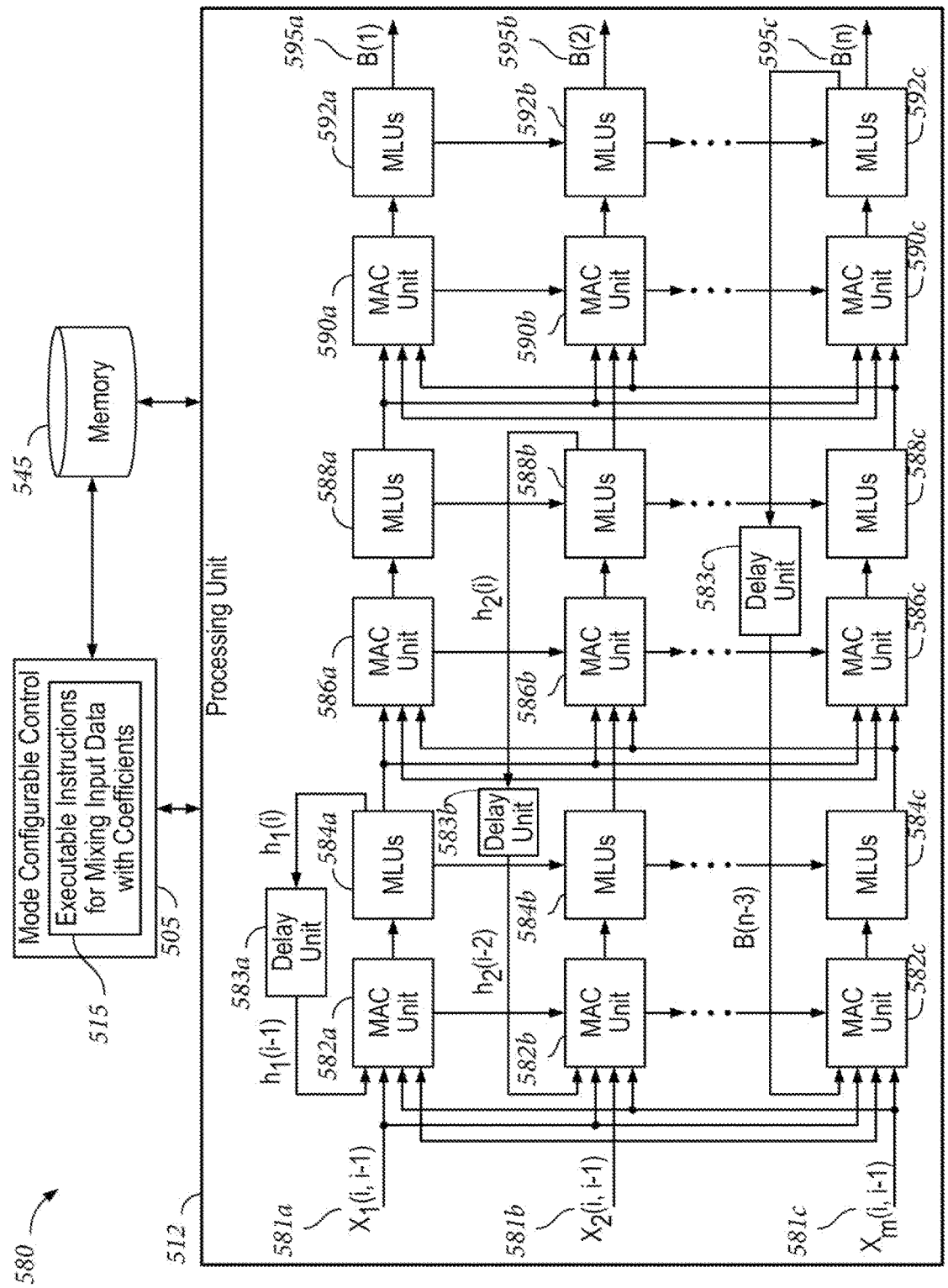

FIG. 5E is a schematic illustration of a processing unit 512 arranged in a system 580 in accordance with examples described herein. Such a hardware implementation (e.g., system 580) may be used, for example, to implement one or more neural networks, such as the self-interference noise calculator 240 of FIG. 2, self-interference noise calculator 500 of FIG. 5A, or recurrent neural network 170 of FIG. 5B. Similarly described elements of FIG. 5E may operate as described with respect to FIG. 5D, except for the delay units 563a-c, 567a-c, and 571a-c of FIG. 5D. For example, FIG. 5E depicts MAC units 582a-c and delay units 583a-c that may operate as described with respect to MAC units 562a-c and delay units 563a-c of FIG. 5D. Accordingly, elements of FIG. 5E, whose numerical indicator is offset by 20 with respect to FIG. 5D, include similarly elements of the processing element 512; e.g., MAC unit 586a operates similarly with respect to MAC unit 566a.

The system 580, including processing element 512, also includes additional features not highlighted in the processing element 512 of FIG. 5D. Different than FIG. 5D, FIG. 5E depicts delay units 583a, 583b, and 583c. Accordingly, the processing unit of FIG. 5E illustrate that processing units 512 may include varying arrangements to the placement of the inputs and outputs of delay units, as illustrated with delay units 583a, 583b, and 583c. For example, the output of MLUs 588b may be provided to delay unit 583b, to generate a delayed version of that processing result from the second layer of MAC units, as an input to the first layer of MAC units, e.g., as an input to MAC unit 582b. Accordingly, the processing unit 512 of system 580 is illustrative that delayed versions of processing results may be provided as inputs to other hidden layers, different than the processing unit 512 of system 550 in FIG. 5D showing respective delayed versions being provided as inputs to the same layer in which those delayed versions were generated (e.g., the output of MLU 568b is provided to delay unit 567b, to generate a delayed version for the MAC unit 566b in the same layer from which the processing result was outputted). Therefore, in the example, even the output B(n) 595c may be provided, from the last hidden layer, to the first hidden layer (e.g., as an input to MAC unit 582c).

Advantageously, such delayed versions of processing results, which may be provided as inputs to different or additional hidden layers, may better compensate "higher-order" memory effects in a recurrent neural network 170 that implements one or more processing units 512 of FIG. 5E, e.g., as compared to the processing unit(s) 512 of FIG. 5C or 5D. For example, higher-order memory effects model the effects of leading and lagging envelope signals used during training of the recurrent neural network 170, to provide output data that estimates a vector representative of self-interference noise between two different antennas of an electronic device 110. In the example, a recurrent neural network 170 that estimates that vector (e.g., a Volterra series model) may include varying delayed versions of processing results that corresponds to such leading and lagging envelopes (e.g., of various envelopes encapsulating the vector). Accordingly, implementing the processing unit 512 incorporates such higher-order memory effects, e.g., for an inference of a recurrent neural network 170, to provide output data 595a-c based on input data 581a-c.

Additionally or alternatively, the processing unit 512 of system 580 may also be utilized for applications in which each portion of the output data 595a-c is to be transmitted as a MIMO signal on a corresponding antenna. For example, the output data 595a may be transmitted as a portion of a MIMO transmission at a first antenna having a first frequency; the output data 595b may be transmitted as a second portion of a MIMO transmission at a second antenna having a second frequency; and the output data 595c may be transmitted as a n'th portion of the MIMO transmission at a n'th antenna having an n'th frequency.

While described in FIGS. 5D and 5E respectively describe a processing unit 512, it can be appreciated that the processing unit 512 or combinations thereof may be implemented in or as any of the self-interference noise calculators described herein, in operation to cancel and/or compensate self-interference noise via the calculation of such noise as implemented in a recurrent neural network. In such implementations, recurrent neural networks may be used to reduce and/or improve errors which may be introduced by self-interference noise. Advantageously, with such an implementation, wireless systems and devices implementing such RNNs increase capacity of their respective wireless networks because additional data may be transmitted in such networks, which would not otherwise be transmitted due to the effects of self-interference noise.

Figure 6:
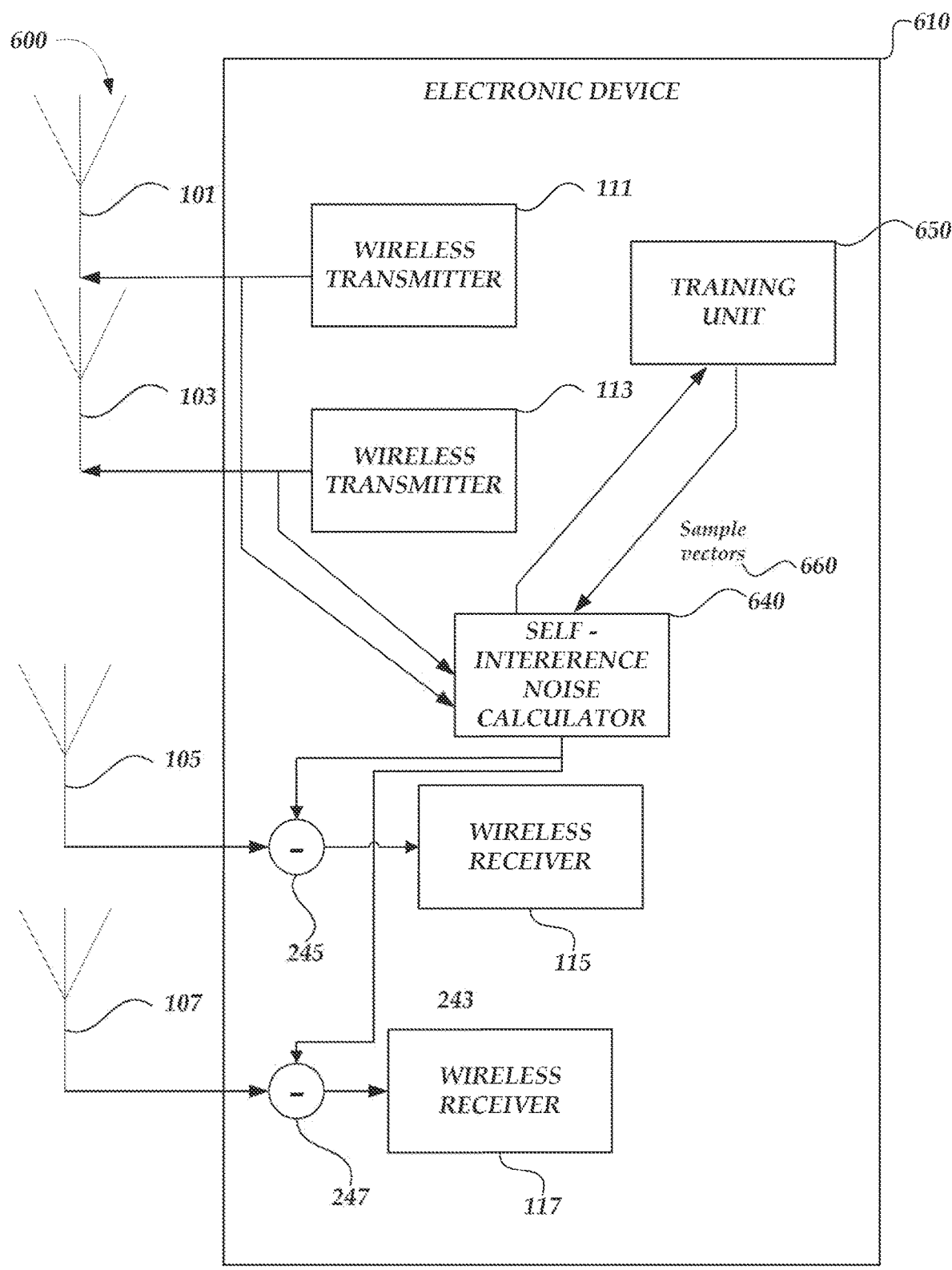
FIG. 6 is a schematic illustration of an electronic device arranged in accordance with examples described herein

FIG. 6 is a schematic illustration 600 of an electronic device 610 arranged in accordance with examples described herein. The electronic device 610 includes antennas 101, 103, 105, 107; wireless transmitters 111, 113; wireless receivers 115, 117; and compensation components 245, 247, which may operate in a similar fashion as described with reference to FIG. 2. The electronic device 610 also includes the self-interference noise calculator 640 and training unit 650 that may provide sample vectors 660 to the self-interference noise calculator 640. The self-interference noise calculator 500 may be utilized to implement the self-interference noise calculator 640, for example. The training unit may determine center vectors Ci and the connection weights $W_{ij}$, for example, by optimizing the minimized error of adjusted signals (e.g., adjusted signals 508 yi(n) of FIG. 5). For example, an optimization problem can be solved utilizing a gradient descent procedure that computes the error, such that the minimized error may be expressed as:

$$E = \sum_{n=1}^{M} \|Y(n) - \hat{Y}(n)\|^2 \qquad (9)$$

$\hat{Y}(n)$ may be a corresponding desired output vector. To solve this minimization problem, the training unit 650 may utilize sample vectors to determine the center vectors Ci and the connection weights $W_{ij}$.

To determine the center vectors Ci, the training unit 650 may perform a cluster analysis (e.g., a k-means cluster algorithm) to determine at least one center vector among a corresponding set of vectors, such as sample vectors 660 based on training points or random vectors. In the sample vector approach, a training point may be selected towards the center for each of the sample vectors 660. The training point may be center of each cluster partition of a set of the sample vectors 660, such that optimizing the cluster center is expressed as minimized error away from the cluster center for a given training point in the cluster partition. Such a relationship may be expressed as:

$$E_{k\_means} = \sum_{j=1}^{H} \sum_{n=1}^{M} B_{jn} \|X(n) - C_j\|^2 \qquad (10)$$

where $B_{jn}$ is the cluster partition or membership function forming an H×M matrix. Each column of H×M matrix represents an available sample vector and each row of H×M matrix represents a cluster. Each column may include a single "1" in the row corresponding to the cluster nearest to that training point and zeroes in the other entries of that column. The training unit 650 may initialize the center of each cluster to a different randomly chosen training point. Then each training example is assigned by the training unit 650 to a processing element (e.g., a processing element 506) nearest to it. When all training points have been assigned by the training unit 650, the training unit 650 finds the average position of the training point for each cluster and moves the cluster center to that point, when the error away from the cluster center for each training point is minimized, denoting the set of center vectors Ci for the processing elements (e.g., the processing elements 506).

To determine the connection weights $W_{ij}$ for the connections between processing elements 506 and processing elements 509, the training unit 650 may utilize a linear least-squares optimization according to a minimization of the weights expressed as:

$$\min_W \sum_{n=1}^{M} \|Y(n) - \hat{Y}(n)\|^2 = \min_W \|WF - \hat{Y}\|^2 \qquad (11)$$

where W={$W_{ij}$} is the L×H matrix of the connection weights, F is an H×M matrix comprising the outputs hi(n) of the processing elements 506, expressed in Equation 11. $\hat{Y}(n)$ may be a corresponding desired output matrix, with an L×M size. Accordingly, in matrix algebra form, connection weight matrix W may be expressed as $$W = \hat{Y} \ F^+ = \hat{Y} \lim_{a \to 0} F^T (FF^T + aI)^{-1} \qquad (12)$$

where $F^+$ is the pseudo-inverse of F.

In some examples, for example in the context of self-interference calculator 500 implemented as self-interference noise calculator 640, to determine the connection weights $W_{ij}$ for the connections between processing elements 506 and processing elements 509, a training unit 650 may utilize a batch-processing embodiment where sample sets are readily available (e.g., available to be retrieved from a memory). The training unit 650 may randomly initialize the connection weights in the connection weight matrix W. The output vector Y(n) may be computed in accordance with Equation 11. An error term $\varepsilon_i(n)$ may be computed for each processing element 506, which may be expressed as:

$$e_i(n) = y_i(n) - \hat{y}_i(n)(i=1,2,\ldots,L) \qquad (13)$$

where $\hat{y}_i(n)$ is a corresponding desired output vector. The connection weights may be adjusted in the batch-processing embodiment in accordance with a machine learning expression where a γ is the learning-rate parameter which could be fixed or time-varying. In the example, the machine learning expression may be:

$$W_{ij}(n+1) = W_{ij}(n) + \gamma e_i(n) f_j(\|X(n) - C_i\|)(i=1,2,\ldots,L; \\ j=1,2,\ldots,M) \qquad (14)$$

Such a process may iterate until passing a specified error threshold. In the example, the total error may be expressed as:

$$\varepsilon = \|Y(n) - \hat{Y}(n)\|^2$$

Accordingly, the training unit 650 may iterate recursively the process described herein until the error ε passes the specified error threshold, such as passing below the specified error threshold.

In some examples, when the training unit 650 is determining the center vectors Ci that are a non-linear set of vectors fitting a Gaussian function, a scaling factor σ may be required before determination of the connection weights $W_{ij}$ for the connections between processing elements 506 and processing elements 509 of a self-interference calculator 500 implemented as self-interference calculator 640. In a Gaussian function example, a convex hull of the vectors Ci may be required such that the training points allow a smooth fit for the output of the processing elements 506. Accordingly, each center vector Ci may be related to another center vector Ci of the processing elements 506, such that each center vector Ci activates another center vector Ci when computing the connection weights. A scaling factor may be based on heuristic that computes the P-nearest neighbor, such that:

$$\sigma_i = \frac{1}{P}\sum_{j=1}^{P} \|C_j - C_i\|^2$$
$$(i = 1, 2, \ldots, H)$$

where $C_j$ (for i=1, 2, ..., H) are the P-nearest neighbors of $C_i$.

Figure 7:
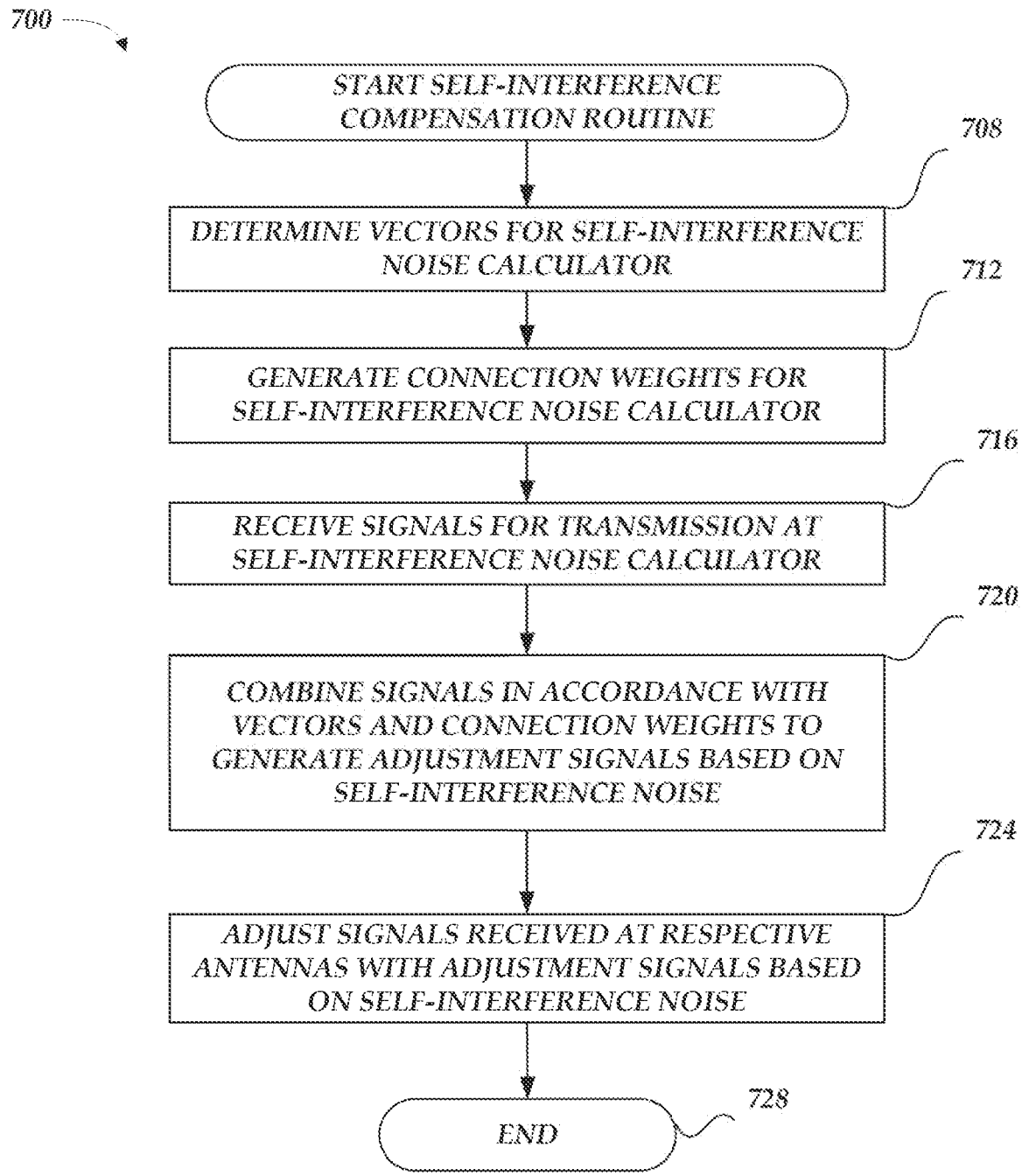
FIG. 7 is a schematic illustration of a full duplex compensation method arranged in accordance with examples described herein.

FIG. 7 is a schematic illustration of a full duplex compensation method 700 in accordance with examples described herein. Example method 700 may be implemented using, for example, electronic device 102, 110 of FIG. 1, electronic device 110 in FIG. 2, electronic device 610, or any system or combination of the systems depicted in FIG. 1-2, 5A-5E, or 6 described herein. The operations described in blocks 708-728 may also be stored as computer-executable instructions in a computer-readable medium.

Example method 700 may begin with block 708 that starts execution of the self-interference compensation method and recites "determine vectors for self-interference noise calculator." In the example, the center vectors may be determined according a cluster analysis. For example, an error may be minimized such that the distance from the cluster center to a given training point is minimized. Block 708 may be followed by block 712 that recites "generate connection weights for self-interference noise calculator." In the example, the connection weights may be determined according to a linear least-squares optimization or a batch processing embodiment as described herein. Block 712 may be followed by block 716 that recites "receive signal for transmission at self-interference noise calculator." Transmitter output data x1(n), x2(n), x3(n), xN(n) 502 may be received as input to a self-interference noise calculator. In the example, transmitter output may be a stream of transmission data from a corresponding transmitter that is performing RF operations on corresponding signals to be transmitted.

Block 716 may be followed by block 720 that recites "combine signals in accordance with vectors and connection weights to generate adjustment signals based on self-interference noise." For example, various ALUs, such as multiplication units, in an integrated circuit may be configured to operate as the circuitry of FIGS. 5A-E, thereby combining the transmitter output data x1(n), x2(n), x3(n), xN(n) 502 to generate adjusted signals y1(n), y2(n), y3(n), yL(n) 508 as described herein. Block 720 may be followed by a decision block 724 that recites "adjust signals received at respective antennas with adjustment signals based on self-interference noise." In the example, compensation components 245, 247 may receive the adjusted signals y1(n), y2(n) 241, 243 and compensate an incoming received wireless transmission from antennas 105, 107. In the example, the compensation components 245, 247 may subtract the adjusted signals y1(n), y2(n) 241, 243 from the received wireless transmission to produce compensated received signals for the respective wireless receivers 115, 117, thereby achieving full duplex compensation mode. Block 724 may be followed by block 728 that ends the example method 700.

In some examples, the blocks 708 and 712 may be an optional block. For example, determination of the center vectors and the connection weights may occur during a training mode of an electronic device described herein, while the remaining steps of method 700 may occur during an operation mode of the electronic devices described herein.

Figure 8:
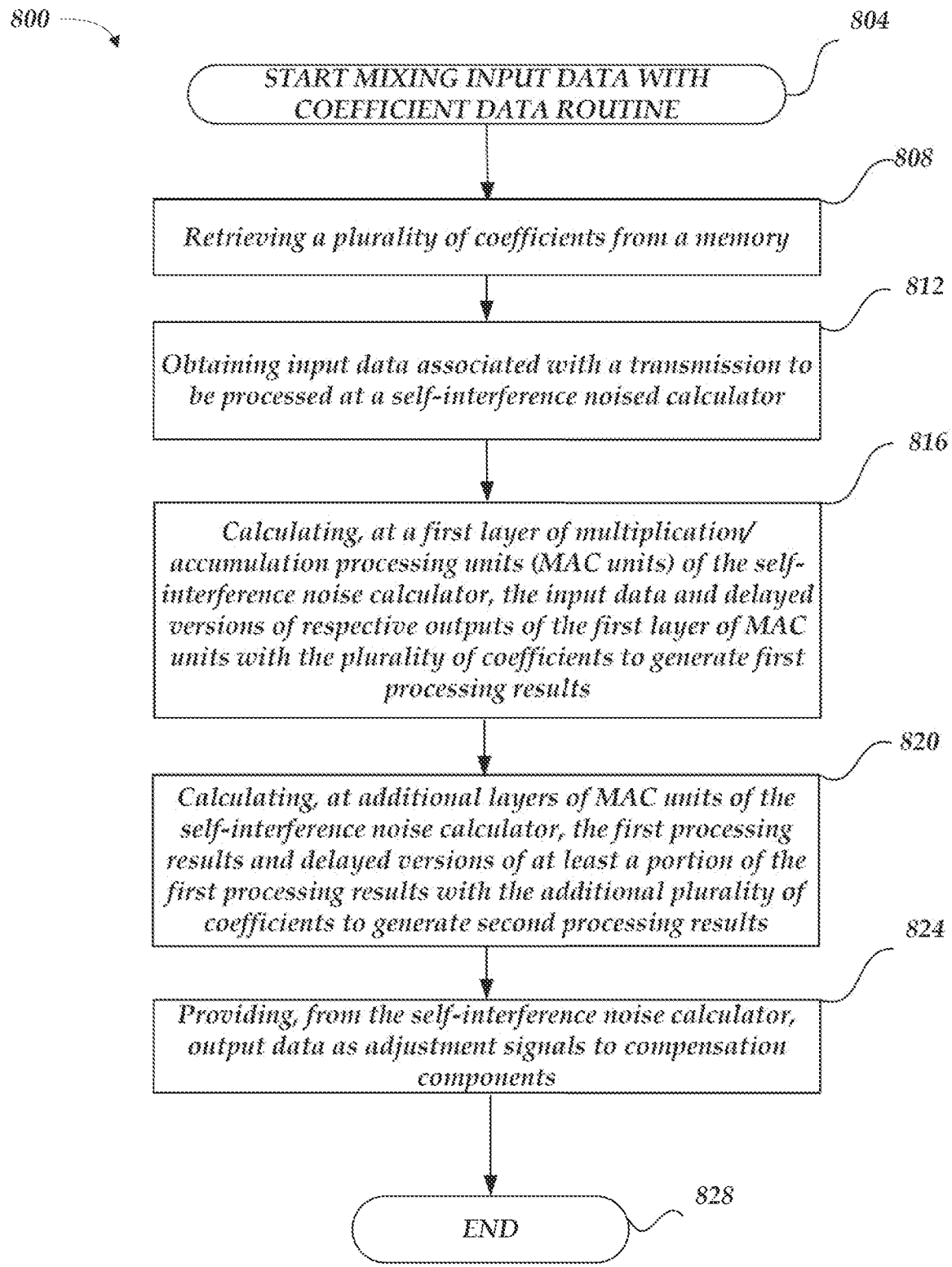
FIG. 8 is a flowchart of a method arranged in accordance with examples described herein.

FIG. 8 is a flowchart of a method 800 in accordance with examples described herein. Example method 800 may be implemented using, for example, electronic device 102, 110 of FIG. 1, electronic device 110 in FIG. 2, electronic device 610, or any system or combination of the systems depicted in FIG. 1-2, 5A-5E, or 6 described herein. In some examples, the blocks in example method 800 may be performed by a computing device such as an electronic device 110 of FIG. 1 and/or in conjunction with a processing unit, such as processing unit 512 of FIG. 5C-5E. The operations described in blocks 804-828 may also be stored as computer-executable instructions in a computer-readable medium such as the mode configurable control 505, storing the executable instructions 515.

Example method 800 may begin with a block 804 that starts execution of the mixing input data with coefficient data routine. The method may include a block 808 recites "retrieving a plurality of coefficients from a memory." As described herein, a processing unit may retrieve coefficients for mixing with input data; for example, utilizing a memory look-up unit. For example, the memory may store (e.g., in a database) coefficients representative of self-interference noise among various antennas of an electronic device. For example, the processing unit may request the coefficients from a memory part of the implementing computing device, from a memory part of an external computing device, or from a memory implemented in a cloud-computing device. In turn, the plurality of coefficients may be retrieved from the memory as requested by the processing unit.

Block 808 may be followed by block 816 that recites "obtaining input data associated with a transmission to be processed at a self-interference noise calculator." The input data may correspond to transmitter output data $x_1(n)$, $x_2(n)$ 221, 223 that is received as input data at a self-interference noise calculator 240 or any of the self-interference noise calculators described herein. Block 816 may be followed by block 820 that recites "calculating, at a first layer of multiplication/accumulation processing units (MAC units), the input data and delayed versions of respective outputs of the first layer of MAC units with the plurality of coefficients to generate first processing results." As described herein, the processing unit utilizes the plurality of coefficients such that mixing the coefficients with input data and delayed versions of respective outputs of the first layer of MAC units generates output data that reflects the processing of the input data with coefficients by the circuitry of FIG. 5C, 5D, or 5E. For example, various ALUs in an integrated circuit may be configured to operate as the circuitry of FIG. 5C, 5D, or 5E, thereby mixing the input data and delayed versions of respective outputs of the first layer of MAC units with the coefficients as described herein. For example, with reference to FIG. 5C, the input data and delayed versions of respective outputs of the first layer of MAC units may be calculated with the plurality of coefficients to generate first processing results, at a first layer of multiplication/accumulation processing units (MAC units). In some examples, various hardware platforms may implement the circuitry of FIG. 5C, 5D, or 5E, such as an ASIC, a DSP implemented as part of a FPGA, or a system-on-chip.

Block 816 may be followed by block 820 that recites "calculating, at additional layers of MAC units, the first processing results and delayed versions of at least a portion of the first processing results with the additional plurality of coefficients to generate second processing results." As described herein, the processing unit utilizes additional plurality of coefficients such that mixing the coefficients with certain processing results and delayed versions of at least a portion of those certain processing results generates output data that reflects the processing of the input data with coefficients by the circuitry of FIG. 5C, 5D, or 5E. For example, with reference to FIG. 5C, the processing results of the first layer (e.g., multiplication processing results) and delayed versions of at least a portion of those processing results may be calculated with the additional plurality of coefficients to generate second processing results, at a second layer of multiplication/accumulation processing units (MAC units). The processing results of the second layer may be calculated with an additional plurality of coefficients to generate the output data B(1) 530.

Block 820 may be followed by block 824 that recites "providing, from the self-interference noise calculator, output data as adjustment signals to compensation components." As described herein, the output data may be provided to compensation components 245, 247 to compensate or cancel self-interference noise. Once provided, received signals may also be adjusted based on the adjusted signals, such that both signals being transmitted and received are simultaneously being processed, thereby achieving full-duplex transmission. Block 824 may be followed by block 828 that ends the example method 800. In some examples, the block 808 may be an optional block.

The blocks included in the described example methods 700 and 800 are for illustration purposes. In some embodiments, these blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Figure 9:
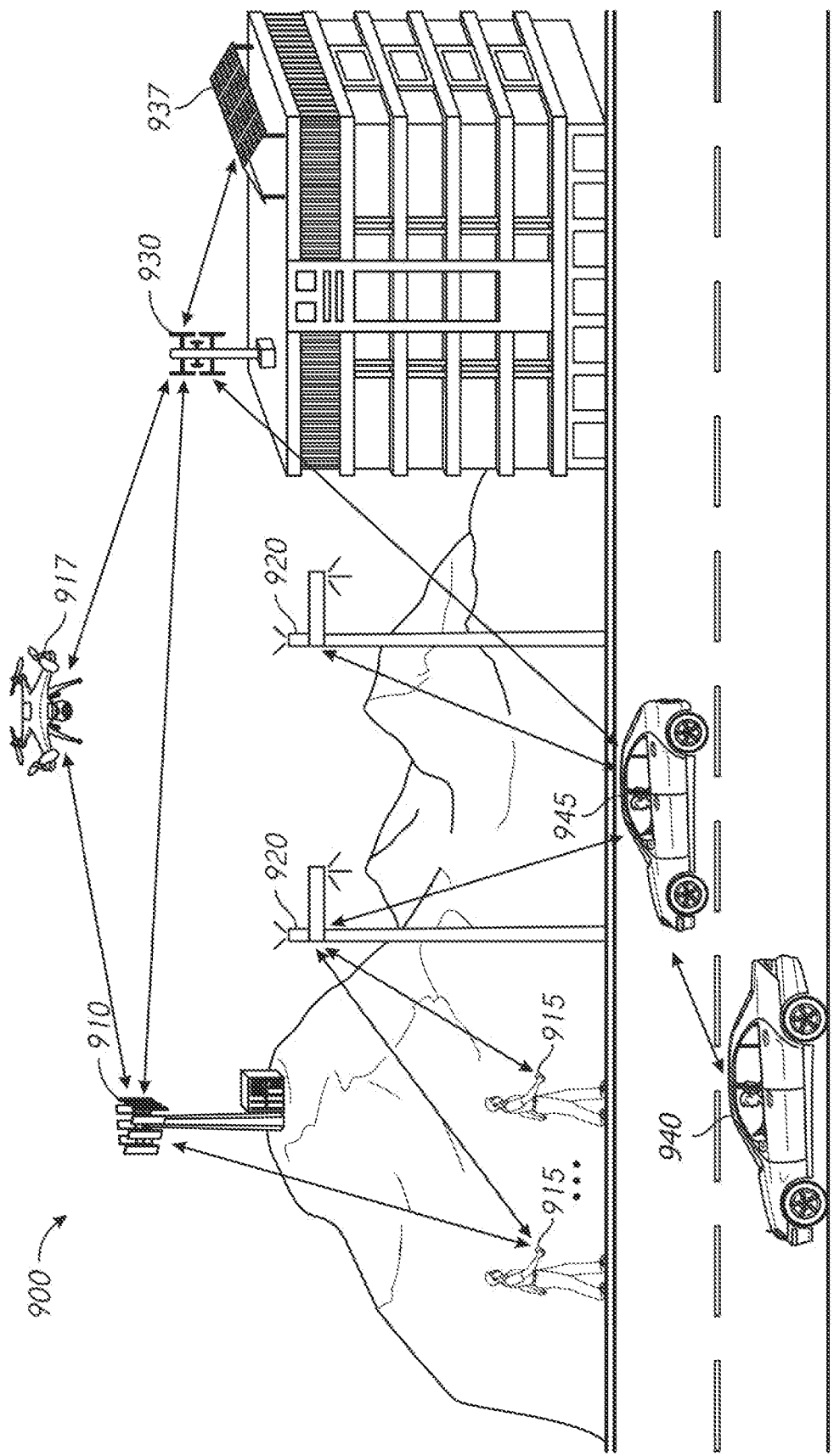
FIG. 9 is a schematic illustration of a wireless communications system arranged in accordance with aspects of the present disclosure.

FIG. 9 illustrates an example of a wireless communications system 900 in accordance with aspects of the present disclosure. The wireless communications system 900 includes a base station 910, a mobile device 915, a drone 917, a small cell 930, and vehicles 940, 945. The base station 910 and small cell 930 may be connected to a network that provides access to the Internet and traditional communication links. The system 900 may facilitate a wide-range of wireless communications connections in a 5G system that may include various frequency bands, including but not limited to: a sub-6 GHz band (e.g., 700 MHz communication frequency), mid-range communication bands (e.g., 2.4 GHz), mmWave bands (e.g., 24 GHz), and a NR band (e.g., 3.5 GHz).

Additionally or alternatively, the wireless communications connections may support various modulation schemes, including but not limited to: filter bank multi-carrier (FBMC), the generalized frequency division multiplexing (GFDM), universal filtered multi-carrier (UFMC) transmission, bi-orthogonal frequency division multiplexing (BFDM), sparse code multiple access (SCMA), non-orthogonal multiple access (NOMA), multi-user shared access (MUSA), and faster-than-Nyquist (FTN) signaling with time-frequency packing. Such frequency bands and modulation techniques may be a part of a standards framework, such as Long Term Evolution (LTE) (e.g., 1.8 GHz band) or other technical specification published by an organization like 3GPP or IEEE, which may include various specifications for subcarrier frequency ranges, a number of subcarriers, uplink/downlink transmission speeds, TDD/FDD, and/or other aspects of wireless communication protocols.

The system 900 may depict aspects of a radio access network (RAN), and system 900 may be in communication with or include a core network (not shown). The core network may include one or more serving gateways, mobility management entities, home subscriber servers, and packet data gateways. The core network may facilitate user and control plane links to mobile devices via the RAN, and it may be an interface to an external network (e.g., the Internet). Base stations 910, communication devices 920, and small cells 930 may be coupled with the core network or with one another, or both, via wired or wireless backhaul links (e.g., S1 interface, X2 interface, etc.).

The system 900 may provide communication links connected to devices or "things," such as sensor devices, e.g., solar cells 937, to provide an Internet of Things ("IoT") framework. Connected things within the IoT may operate within frequency bands licensed to and controlled by cellular network service providers, or such devices or things may. Such frequency bands and operation may be referred to as narrowband IoT (NB-IoT) because the frequency bands allocated for IoT operation may be small or narrow relative to the overall system bandwidth. Frequency bands allocated for NB-IoT may have bandwidths of 1, 5, 10, or 20 MHz, for example.

Additionally or alternatively, the IoT may include devices or things operating at different frequencies than traditional cellular technology to facilitate use of the wireless spectrum. For example, an IoT framework may allow multiple devices in system 900 to operate at a sub-6 GHz band or other industrial, scientific, and medical (ISM) radio bands where devices may operate on a shared spectrum for unlicensed uses. The sub-6 GHz band may also be characterized as and may also be characterized as an NB-IoT band. For example, in operating at low frequency ranges, devices providing sensor data for "things," such as solar cells 937, may utilize less energy, resulting in power-efficiency and may utilize less complex signaling frameworks, such that devices may transmit asynchronously on that sub-6 GHz band. The sub-6 GHz band may support a wide variety of uses case, including the communication of sensor data from various sensors devices. Examples of sensor devices include sensors for detecting energy, heat, light, vibration, biological signals (e.g., pulse, EEG, EKG, heart rate, respiratory rate, blood pressure), distance, speed, acceleration, or combinations thereof. Sensor devices may be deployed on buildings, individuals, and/or in other locations in the environment. The sensor devices may communicate with one another and with computing systems which may aggregate and/or analyze the data provided from one or multiple sensor devices in the environment.

In such a 5G framework, devices may perform functionalities performed by base stations in other mobile networks (e.g., UMTS or LTE), such as forming a connection or managing mobility operations between nodes (e.g., handoff or reselection). For example, mobile device 915 may receive sensor data from the user utilizing the mobile device 915, such as blood pressure data, and may transmit that sensor data on a narrowband IoT frequency band to base station 910. In such an example, some parameters for the determination by the mobile device 915 may include availability of licensed spectrum, availability of unlicensed spectrum, and/ or time-sensitive nature of sensor data. Continuing in the example, mobile device 915 may transmit the blood pressure data because a narrowband IoT band is available and can transmit the sensor data quickly, identifying a time-sensitive component to the blood pressure (e.g., if the blood pressure measurement is dangerously high or low, such as systolic blood pressure is three standard deviations from norm).

Additionally or alternatively, mobile device 915 may form device-to-device (D2D) connections with other mobile devices or other elements of the system 900. For example, the mobile device 915 may form RFID, WiFi, MultiFire, Bluetooth, or Zigbee connections with other devices, including communication device 920 or vehicle 945. In some examples, D2D connections may be made using licensed spectrum bands, and such connections may be managed by a cellular network or service provider. Accordingly, while the above example was described in the context of narrowband IoT, it can be appreciated that other device-to-device connections may be utilized by mobile device 915 to provide information (e.g., sensor data) collected on different frequency bands than a frequency band determined by mobile device 915 for transmission of that information.

Moreover, some communication devices may facilitate ad-hoc networks, for example, a network being formed with communication devices 920 attached to stationary objects and the vehicles 940, 945, without a traditional connection to a base station 910 and/or a core network necessarily being formed. Other stationary objects may be used to support communication devices 920, such as, but not limited to, trees, plants, posts, buildings, blimps, dirigibles, balloons, street signs, mailboxes, or combinations thereof. In such a system 900, communication devices 920 and small cell 930 (e.g., a small cell, femtocell, WLAN access point, cellular hotspot, etc.) may be mounted upon or adhered to another structure, such as lampposts and buildings to facilitate the formation of ad-hoc networks and other IoT-based networks. Such networks may operate at different frequency bands than existing technologies, such as mobile device 915 communicating with base station 910 on a cellular communication band.

The communication devices 920 may form wireless networks, operating in either a hierarchal or ad-hoc network fashion, depending, in part, on the connection to another element of the system 900. For example, the communication devices 920 may utilize a 700 MHz communication frequency to form a connection with the mobile device 915 in an unlicensed spectrum, while utilizing a licensed spectrum communication frequency to form another connection with the vehicle 945. Communication devices 920 may communicate with vehicle 945 on a licensed spectrum to provide direct access for time-sensitive data, for example, data for an autonomous driving capability of the vehicle 945 on a 5.9 GHz band of Dedicated Short Range Communications (DSRC).

Vehicles 940 and 945 may form an ad-hoc network at a different frequency band than the connection between the communication device 920 and the vehicle 945. For example, for a high bandwidth connection to provide time-sensitive data between vehicles 940, 945, a 24 GHz mmWave band may be utilized for transmissions of data between vehicles 940, 945. For example, vehicles 940, 945 may share real-time directional and navigation data with each other over the connection while the vehicles 940, 945 pass each other across a narrow intersection line. Each vehicle 940, 945 may be tracking the intersection line and providing image data to an image processing algorithm to facilitate autonomous navigation of each vehicle while each travels along the intersection line. In some examples, this real-time data may also be substantially simultaneously shared over an exclusive, licensed spectrum connection between the communication device 920 and the vehicle 945, for example, for processing of image data received at both vehicle 945 and vehicle 940, as transmitted by the vehicle 940 to vehicle 945 over the 24 GHz mmWave band. While shown as automobiles in FIG. 9, other vehicles may be used including, but not limited to, aircraft, spacecraft, balloons, blimps, dirigibles, trains, submarines, boats, ferries, cruise ships, helicopters, motorcycles, bicycles, drones, or combinations thereof.

While described in the context of a 24 GHz mmWave band, it can be appreciated that connections may be formed in the system 900 in other mmWave bands or other frequency bands, such as 28 GHz, 37 GHz, 38 GHz, 39 GHz, which may be licensed or unlicensed bands. In some cases, vehicles 940, 945 may share the frequency band that they are communicating on with other vehicles in a different network. For example, a fleet of vehicles may pass vehicle 940 and, temporarily, share the 24 GHz mmWave band to form connections among that fleet, in addition to the 24 GHz mmWave connection between vehicles 940, 945. As another example, communication device 920 may substantially simultaneously maintain a 700 MHz connection with the mobile device 915 operated by a user (e.g., a pedestrian walking along the street) to provide information regarding a location of the user to the vehicle 945 over the 5.9 GHz band. In providing such information, communication device 920 may leverage antenna diversity schemes as part of a massive MIMO framework to facilitate time-sensitive, separate connections with both the mobile device 915 and the vehicle 945. A massive MIMO framework may involve a transmitting and/or receiving devices with a large number of antennas (e.g., 12, 20, 64, 128, etc.), which may facilitate precise beamforming or spatial diversity unattainable with devices operating with fewer antennas according to legacy protocols (e.g., WiFi or LTE).

The base station 910 and small cell 930 may wirelessly communicate with devices in the system 900 or other communication-capable devices in the system 900 having at the least a sensor wireless network, such as solar cells 937 that may operate on an active/sleep cycle, and/or one or more other sensor devices. The base station 910 may provide wireless communications coverage for devices that enter its coverages area, such as the mobile device 915 and the drone 917. The small cell 930 may provide wireless communications coverage for devices that enter its coverage area, such as near the building that the small cell 930 is mounted upon, such as vehicle 945 and drone 917.

Generally, a small cell 930 may be referred to as a small cell and provide coverage for a local geographic region, for example, coverage of 200 meters or less in some examples. This may contrasted with at macrocell, which may provide coverage over a wide or large area on the order of several square miles or kilometers. In some examples, a small cell 930 may be deployed (e.g., mounted on a building) within some coverage areas of a base station 910 (e.g., a macrocell) where wireless communications traffic may be dense according to a traffic analysis of that coverage area. For example, a small cell 930 may be deployed on the building in FIG. 9 in the coverage area of the base station 910 if the base station 910 generally receives and/or transmits a higher amount of wireless communication transmissions than other coverage areas of that base station 910. A base station 910 may be deployed in a geographic area to provide wireless coverage for portions of that geographic area. As wireless communications traffic becomes more dense, additional base stations 910 may be deployed in certain areas, which may alter the coverage area of an existing base station 910, or other support stations may be deployed, such as a small cell 930. Small cell 930 may be a femtocell, which may provide coverage for an area smaller than a small cell (e.g., 100 meters or less in some examples (e.g., one story of a building)).

While base station 910 and small cell 930 may provide communication coverage for a portion of the geographical area surrounding their respective areas, both may change aspects of their coverage to facilitate faster wireless connections for certain devices. For example, the small cell 930 may primarily provide coverage for devices surrounding or in the building upon which the small cell 930 is mounted. However, the small cell 930 may also detect that a device has entered is coverage area and adjust its coverage area to facilitate a faster connection to that device.

For example, a small cell 930 may support a massive MIMO connection with the drone 917, which may also be referred to as an unmanned aerial vehicle (UAV), and, when the vehicle 945 enters it coverage area, the small cell 930 adjusts some antennas to point directionally in a direction of the vehicle 945, rather than the drone 917, to facilitate a massive MIMO connection with the vehicle, in addition to the drone 917. In adjusting some of the antennas, the small cell 930 may not support as fast as a connection to the drone 917 at a certain frequency, as it had before the adjustment. For example, the small cell 930 may be communicating with the drone 917 on a first frequency of various possible frequencies in a 4G LTE band of 1.8 GHz. However, the drone 917 may also request a connection at a different frequency with another device (e.g., base station 910) in its coverage area that may facilitate a similar connection as described with reference to the small cell 930, or a different (e.g., faster, more reliable) connection with the base station 910, for example, at a 3.5 GHz frequency in the 5G NR band. Accordingly, the system 900 may enhance existing communication links in providing additional connections to devices that may utilize or demand such links, while also compensating for any self-interference noise generated by the drone 917 in transmitting, for example, in both the 4GE LTE and 5G NR bands. In some examples, drone 917 may serve as a movable or aerial base station.

The wireless communications system 900 may include devices such as base station 910, communication device 920, and small cell 930 that may support several connections at varying frequencies to devices in the system 900, while also compensating for self-interference noise utilizing self-interference noise calculators, such as self-interference noise calculator 240 or 500. Such devices may operate in a hierarchal mode or an ad-hoc mode with other devices in the network of system 900. While described in the context of a base station 910, communication device 920, and small cell 930, it can be appreciated that other devices that can support several connections with devices in the network, while also compensating for self-interference noise utilizing self-interference noise calculators, may be included in system 900, including but not limited to: macrocells, femtocells, routers, satellites, and RFID detectors.

In various examples, the elements of wireless communication system 900, such as base station 910, a mobile device 915, a drone 917, communication device 920 a small cell 930, and vehicles 940, 945, may be implemented as an electronic device described herein that compensate for self-interference noise utilizing self-interference noise calculators. For example, the communication device 920 may be implemented as electronic devices described herein, such as electronic device 102, 110 of FIG. 1, electronic device 110 in FIG. 2, electronic device 610, or any system or combination of the systems depicted in FIG. 1-2, 5A-5E, or 6 described herein, or any system or combination of the systems depicted in the Figures described herein.

Figure 10:
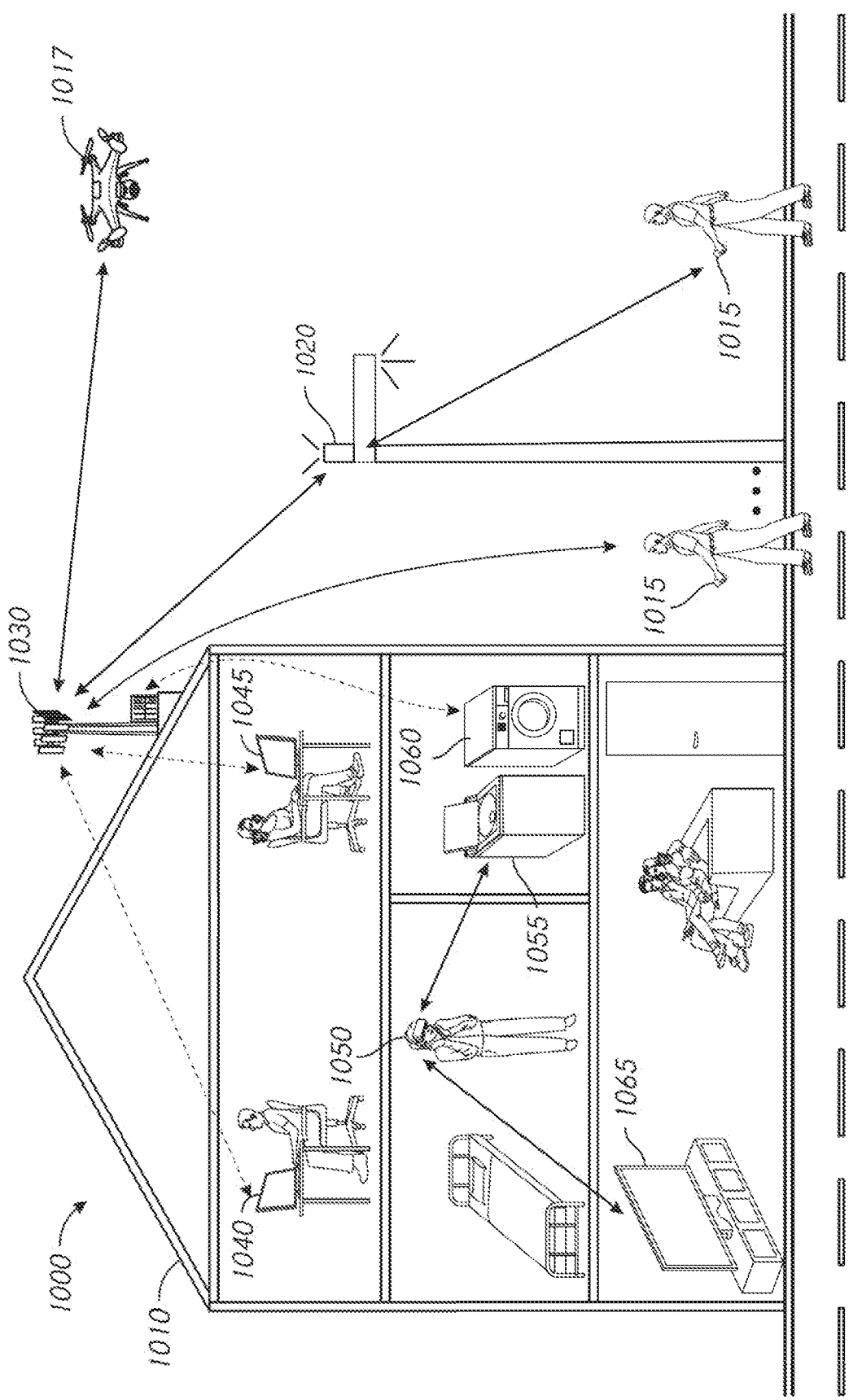
FIG. 10 is a schematic illustration of another wireless communications system arranged in accordance with aspects of the present disclosure.

FIG. 10 illustrates an example of a wireless communications system 1000 in accordance with aspects of the present disclosure. The wireless communications system 1000 includes a mobile device 1015, a drone 1017, a communication device 1020, and a small cell 1030. A building 1010 also includes devices of the wireless communication system 1000 that may be configured to communicate with other elements in the building 1010 or the small cell 1030. The building 1010 includes networked workstations 1040, 1045, virtual reality device 1050, IoT devices 1055, 1060, and networked entertainment device 1065. In the depicted system 1000, IoT devices 1055, 1060 may be a washer and dryer, respectively, for residential use, being controlled by the virtual reality device 1050. Accordingly, while the user of the virtual reality device 1050 may be in different room of the building 1010, the user may control an operation of the IoT device 1055, such as configuring a washing machine setting. Virtual reality device 1050 may also control the networked entertainment device 1065. For example, virtual reality device 1050 may broadcast a virtual game being played by a user of the virtual reality device 1050 onto a display of the networked entertainment device 1065.

The small cell 1030 or any of the devices of building 1010 may be connected to a network that provides access to the Internet and traditional communication links. Like the system 900, the system 1000 may facilitate a wide-range of wireless communications connections in a 5G system that may include various frequency bands, including but not limited to: a sub-6 GHz band (e.g., 700 MHz communication frequency), mid-range communication bands (e.g., 2.4 GHz), and mmWave bands (e.g., 24 GHz). Additionally or alternatively, the wireless communications connections may support various modulation schemes as described above with reference to system 900. System 1000 may operate and be configured to communicate analogously to system 900. Accordingly, similarly numbered elements of system 1000 and system 900 may be configured in an analogous way, such as communication device 920 to communication device 1020, small cell 930 to small cell 1030, etc. . . . . .

Like the system 900, where elements of system 900 are configured to form independent hierarchal or ad-hoc networks, communication device 1020 may form a hierarchal network with small cell 1030 and mobile device 1015, while an additional ad-hoc network may be formed among the small cell 1030 network that includes drone 1017 and some of the devices of the building 1010, such as networked workstations 1040, 1045 and IoT devices 1055, 1060.

Devices in communication system 1000 may also form (D2D) connections with other mobile devices or other elements of the system 1000. For example, the virtual reality device 1050 may form a narrowband IoT connections with other devices, including IoT device 1055 and networked entertainment device 1065. As described above, in some examples, D2D connections may be made using licensed spectrum bands, and such connections may be managed by a cellular network or service provider. Accordingly, while the above example was described in the context of a narrowband IoT, it can be appreciated that other device-to-device connections may be utilized by virtual reality device 1050.

In various examples, the elements of wireless communication system 1000, such as the mobile device 1015, the drone 1017, the communication device 1020, and the small cell 1030, the networked workstations 1040, 1045, the virtual reality device 1050, the IoT devices 1055, 1060, and the networked entertainment device 1065, may be implemented as electronic devices described herein that compensate for self-interference noise utilizing self-interference noise calculators. For example, the communication device 1020 may be implemented as electronic devices described herein, such as electronic device 102, 110 of FIG. 1, electronic device 110 in FIG. 2, electronic device 610, or any system or combination of the systems depicted in FIG. 1-2, 5A-5E, or 6 described herein, or any system or combination of the systems depicted in the Figures described herein.

Certain details are set forth above to provide a sufficient understanding of described examples. However, it will be clear to one skilled in the art that examples may be practiced without various of these particular details. The description herein, in connection with the appended drawings, describes example configurations and does not represent all the examples that may be implemented or that are within the scope of the claims. The terms "exemplary" and "example" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Techniques described herein may be used for various wireless communications systems, which may include multiple access cellular communication systems, and which may employ code division multiple access (CDMA), time division multiple access (TDMA), frequency division multiple access (FDMA), orthogonal frequency division multiple access (OFDMA), or single carrier frequency division multiple access (SC-FDMA), or any a combination of such techniques. Some of these techniques have been adopted in or relate to standardized wireless communication protocols by organizations such as Third Generation Partnership Project (3GPP), Third Generation Partnership Project 2 (3GPP2) and IEEE. These wireless standards include Ultra Mobile Broadband (UMB), Universal Mobile Telecommunications System (UMTS), Long Term Evolution (LTE), LTE-Advanced (LTE-A), LTE-A Pro, New Radio (NR), IEEE 802.11 (WiFi), and IEEE 802.16 (WiMAX), among others.

The terms "5G" or "5G communications system" may refer to systems that operate according to standardized protocols developed or discussed after, for example, LTE Releases 13 or 14 or WiMAX 802.16e-2005 by their respective sponsoring organizations. The features described herein may be employed in systems configured according to other generations of wireless communication systems, including those configured according to the standards described above.

The various illustrative blocks and modules described in connection with the disclosure herein may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above are also included within the scope of computer-readable media.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific examples have been described herein for purposes of illustration, various modifications may be made while remaining with the scope of the claimed technology. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method comprising:
transmitting a plurality of transmit signals to be transmitted at a first plurality of antennas;
simultaneously, receiving a plurality of receive signals received at respective antennas of a second plurality of antennas;
calculating, at a recurrent neural network (RNN) coupled to a plurality of wireless transmit paths, first processing results based on the plurality of transmit signals as input data and delayed versions of respective outputs of a first plurality of multiplication/accumulation processing units (MAC units) with a plurality of coefficients to generate first processing results;
calculating, at the RNN, output data based on the first processing results and delayed versions of respective outputs of a respective additional plurality of MAC units with an additional plurality of coefficients;
providing, from the RNN, the output data as a plurality of adjustment signals to a plurality of wireless receive paths; and
adjusting the plurality of receive signals received at the respective antennas of the second plurality of antennas with a corresponding adjustment signal of the plurality of adjustment signals.

2. The method of claim 1, wherein the plurality of transmit signals to be transmitted at the first plurality of antennas comprises transmitting, on the first plurality of antennas, the plurality of transmit signals at a Radio Frequency (RF) frequency band of at least one of a sub-6 GHz band, a mid-range communication band, a mmWave band, or a New Radio (NR) band.

3. The method of claim 1, wherein certain MAC units of the first plurality of MAC units are selected based on a quantity of the second plurality of antennas.

4. The method of claim 1, wherein the calculating first processing results further comprises:
providing, from a plurality of delay units, the delayed versions of respective outputs of the first plurality of MAC units as input to the first plurality of MAC units; and
multiplying, at respective MAC units of the first plurality of MAC units, the delayed version of respective outputs of the first plurality of MAC units with the input data to generate multiplication processing results.

5. The method of claim 4, wherein the calculating first processing results further comprises:
storing, at certain memory look-up units (MLU units) of a plurality of MLU units, the multiplication processing results; and
retrieving, at the certain MLU units of the plurality of MLU units, the multiplication processing results and a plurality of coefficients for the certain MLU units to generate the first processing results based on the multiplication processing results and the plurality of coefficients.

6. The method of claim 1, wherein the delayed versions of respective outputs of the first plurality of MAC units are representative of a Markov process.

7. An apparatus comprising:
a plurality of radio frequency (RF) antennas configured to transmit a plurality of RF wireless transmissions based on a plurality of transmit signals;
an additional plurality of RF antennas configured to receive a plurality of receive signals;
a recurrent neural network comprising a plurality of multiplication/accumulation processing (MAC) units, a plurality of delay units, and a plurality of memory look-up units (MLU units); and
non-transitory computer readable media encoded with executable instructions which, when executed by at least one processing unit, is configured to cause the apparatus to perform operations comprising:
transmitting the plurality of transmit signals as the plurality of RF wireless transmissions at the plurality of RF antennas;
simultaneously, receiving the plurality of receive signals received at respective antennas of the additional plurality of RF antennas;
calculating processing results based on the plurality of transmit signals as input data and delayed versions of respective outputs of at least a portion of the plurality of MAC units with a plurality of coefficients to generate processing results; and
providing output data as a plurality of adjustment signals based partly on the plurality of processing results;
wherein the additional plurality of RF antennas configured to receive the plurality of receive signals, and the operations further comprising:
adjusting the plurality of receive signals received at respective antennas of the additional plurality of RF antennas with a corresponding adjustment signal of the plurality of adjustment signals.

8. The apparatus of claim 7, wherein each delay unit of the plurality of delay units is coupled to a respective MAC unit of the portion and configured to provide the delayed versions to the respective MAC unit based on a respective output of the at least portion of the plurality of MAC units.

9. The apparatus of claim 7, wherein the apparatus corresponds to one of a desktop device, a laptop device, a cellular phone device, a tablet device, an appliance device, an automobile communications device, an electronic drone device, or combinations thereof.

10. An apparatus comprising:
a plurality of antennas, at least two antennas of the plurality of antennas configured to transmit a respective radio frequency (RF) signal based on a respective transmit signal of a plurality of transmit signals;
an additional plurality of antennas, the additional plurality of antennas configured to receive a plurality of receive signals; and
a recurrent neural network (RNN) coupled to each antenna of the plurality of antennas and configured to generate a respective adjustment signal of a plurality of adjustment signals based on the respective transmit signal of the plurality of transmit signals, wherein the RNN is configured to adjust the plurality of receive signals with the respective adjustment signal of the plurality of adjustment signals; and a plurality of processing units configured for bit manipulation and configured to receive the respective transmit signal; and a plurality of multiplication/accumulation (MAC) units, each MAC unit configured to generate a plurality of multiplication processing results based on the respective transmit signal and a delayed version of at least one of the plurality of multiplication processing results.

11. The apparatus of claim 10, further comprising:

a plurality of memory look-up units (MLUs) configured to store and provide respective multiplication processing results of the plurality of multiplication processing results, wherein a portion of the plurality of the MLUs configured to provide output data as the plurality of adjustment signals based on the respective multiplication processing results being mixed using a plurality of coefficients.

12. The apparatus of claim 11, further comprising:

a plurality of delay units, each delay unit associated with a respective MAC unit and configured to provide the delayed versions of the at least one of the plurality of multiplication processing results based on a portion of the respective multiplication processing results provided by respective MLUs of the plurality of MLUs.

13. The apparatus of claim 12, wherein the each delay unit of the plurality of delay units is configured to introduce a time delay to the at least one of the plurality of multiplication processing results.

14. The apparatus of claim 12, wherein certain delay units of the plurality of delay units that are coupled to certain MAC units, in at least one layer of MAC units, are configured to introduce a same time delay.

15. The apparatus of claim 12, wherein the plurality of delay units comprise one or more of a D-flop, an AND logic gate, an OR logic gate, or a NOR logic gate.

16. The apparatus of claim 10, further comprising:

a plurality of compensation components configured to receive the plurality of adjustment signals from the RNN and combine the plurality of adjustment signals with a respective receive signal of the plurality of receive signals to reduce self-interference.

17. The apparatus of claim 16, wherein each compensation component is configured to subtract a respective adjustment signal from the respective receive signal provided by the RNN to generate a respective compensated received signal.

18. The apparatus of claim 16, wherein the plurality of compensation components are implemented using circuitry, firmware, or combinations thereof.

* * * * *